United States Patent
Shahana et al.

(10) Patent No.: US 12,269,560 B2
(45) Date of Patent: Apr. 8, 2025

(54) HUMAN-POWERED VEHICLE CONTROL DEVICE

(71) Applicant: Shimano Inc., Osaka (JP)

(72) Inventors: Satoshi Shahana, Osaka (JP); Hitoshi Takayama, Osaka (JP)

(73) Assignee: Shimano Inc., Osaka (JP)

( * ) Notice: Subject to any disclaimer, the term of this patent is extended or adjusted under 35 U.S.C. 154(b) by 841 days.

(21) Appl. No.: 17/505,895

(22) Filed: Oct. 20, 2021

(65) Prior Publication Data

US 2022/0135176 A1  May 5, 2022

(30) Foreign Application Priority Data

Oct. 30, 2020 (JP) ................. 2020-183006

(51) Int. Cl.
  *B62M 6/50* (2010.01)
  *B62J 45/412* (2020.01)
  *B62J 45/413* (2020.01)
  *B62J 45/415* (2020.01)

(52) U.S. Cl.
  CPC ............. *B62M 6/50* (2013.01); *B62J 45/412* (2020.02); *B62J 45/413* (2020.02); *B62J 45/4152* (2020.02)

(58) Field of Classification Search
  CPC ... B62M 6/50; B62M 6/55; B62M 6/45; B62J 45/412; B62J 45/413; B62J 45/4152; B62J 45/411; B62J 45/414
  See application file for complete search history.

(56) References Cited

U.S. PATENT DOCUMENTS

| | | | |
|---|---|---|---|
| 2015/0136509 A1* | 5/2015 | Tanaka | B60L 15/20 180/206.3 |
| 2018/0215432 A1* | 8/2018 | Tsuchizawa | B62M 6/50 |
| 2019/0193810 A1 | 6/2019 | Tsuchizawa | |
| 2019/0300106 A1* | 10/2019 | Terashima | B62M 6/70 |
| 2019/0300119 A1* | 10/2019 | Shahana | B62M 6/50 |

FOREIGN PATENT DOCUMENTS

| | | |
|---|---|---|
| CN | 109720496 A | 5/2019 |
| JP | 7-33070 A | 2/1995 |
| JP | 7-309283 A | 11/1995 |

(Continued)

*Primary Examiner* — Calvin Cheung
(74) *Attorney, Agent, or Firm* — Global IP Counselors, LLP

(57) ABSTRACT

A human-powered vehicle control device for a human-powered vehicle comprises an electronic controller. The electronic controller is configured to control a motor, which applies a propulsion force to the human-powered vehicle, in accordance with a human driving force input to the human-powered vehicle. The electronic controller is configured to control the motor to change at least one of a maximum value of an output of the motor, a first changing ratio of an increase rate of the output of the motor to an increase rate of the human driving force, and a second changing ratio of a decrease rate of the output of the motor to a decrease rate of the human driving force in accordance with transmission information related to a transmission ratio in a power transmission path between an input rotational shaft of the human-powered vehicle and a wheel of the human-powered vehicle.

31 Claims, 12 Drawing Sheets

(56) References Cited

FOREIGN PATENT DOCUMENTS

| | | |
|---|---|---|
| JP | 9-207866 A | 8/1997 |
| JP | 10-138987 A | 5/1998 |
| JP | 2011-240919 A | 12/2011 |
| JP | 5842105 B2 | 11/2015 |
| JP | 2016-22798 A | 2/2016 |
| JP | 2019-64353 A | 4/2019 |
| JP | 2019-116249 A | 7/2019 |
| WO | 2018/123160 A1 | 7/2018 |

* cited by examiner

HUMAN-POWERED VEHICLE CONTROL DEVICE

CROSS-REFERENCE TO RELATED APPLICATIONS

This application claims priority to Japanese Patent Application No. 2020-183006, filed on Oct. 30, 2020. The entire disclosure of Japanese Patent Application No. 2020-183006 is hereby incorporated herein by reference.

BACKGROUND

Technical Field

The present disclosure generally relates to a human-powered vehicle control device for a human-powered vehicle.

Background Information

Japanese Laid-Open Patent Publication No. 2016-22798 (Patent Document 1) discloses an example of a control device for a human-powered vehicle. The control device for a human-powered vehicle of Patent Document 1 controls a motor that assists in propulsion of the human-powered vehicle in accordance with a human driving force input to the human-powered vehicle.

SUMMARY

One objective of the present disclosure is to provide a human-powered vehicle control device for a human-powered vehicle that improves usability.

A human-powered vehicle control device in accordance with a first aspect of the present disclosure is for a human-powered vehicle. The human-powered vehicle control device comprises an electronic controller configured to control a motor, which applies a propulsion force to the human-powered vehicle, in accordance with a human driving force input to the human-powered vehicle. The electronic controller is configured to control the motor to change at least one of a maximum value of an output of the motor, a first changing ratio of an increase rate of the output of the motor to an increase rate of the human driving force, and a second changing ratio of a decrease rate of the output of the motor to a decrease rate of the human driving force in accordance with transmission information related to a transmission ratio in a power transmission path between an input rotational shaft of the human-powered vehicle and a wheel of the human-powered vehicle. The human-powered vehicle control device according to the first aspect controls the motor in accordance with the transmission information so that at least one of the maximum value of the output of the motor, the first changing ratio of the increase rate of the output of the motor to the increase rate of the human driving force, and the second changing ratio of the decrease rate of the output of the motor to the decrease rate of the human driving force is a suitable value. Thus, the usability is improved.

In accordance with a second aspect of the present disclosure, the human-powered vehicle control device according to the first aspect is configured so that the electronic controller is configured to control the motor to change at least one of the maximum value of the output of the motor, the first changing ratio of the increase rate of the output of the motor to the increase rate of the human driving force, and the second changing ratio of the decrease rate of the output of the motor to the decrease rate of the human driving force in accordance with the transmission information in at least one of a case where the human-powered vehicle starts traveling, a case where a rotational speed of the input rotational shaft is lower than or equal to a first rotational speed, a case where a vehicle speed of the human-powered vehicle is lower than or equal to a first speed, and a case where the rotational speed of the input rotational shaft is lower than or equal to the first rotational speed and the human driving force is greater than or equal to a first driving force. The human-powered vehicle control device according to the second aspect controls the motor in a preferred manner in at least one of a case where the human-powered vehicle starts traveling, a case where the rotational speed of the input rotational shaft is lower than or equal to the first rotational speed, a case where the vehicle speed of the human-powered vehicle is lower than or equal to the first speed, and a case where the rotational speed of the input rotational shaft is lower than or equal to the first rotational speed and the human driving force is greater than or equal to the first driving force.

In accordance with a third aspect of the present disclosure, the human-powered vehicle control device according to the first or second aspect is configured so that the electronic controller is configured to control the motor to change the maximum value of the output of the motor in accordance with the transmission information. The electronic controller is configured to control the motor to decrease the maximum value of the output of the motor in a case where the transmission ratio is less than a first ratio from the maximum value of the output of the motor in a case where the transmission ratio is greater than or equal to the first ratio. In a case where the transmission ratio is decreased, a rotational torque of the wheel based on the human driving force increases. In this case, the human-powered vehicle control device according to the third aspect decreases the maximum value of the output of the motor so that the rotational torque of the wheel does not increase in excess.

In accordance with a fourth aspect of the present disclosure, the human-powered vehicle control device according to any one of the first to third aspects is configured so that the electronic controller is configured to control the motor to change the maximum value of the output of the motor in accordance with the transmission information. The electronic controller is configured to control the motor to increase the maximum value of the output of the motor in a case where the transmission ratio is greater than a second ratio from the maximum value of the output of the motor in a case where the transmission ratio is less than or equal to the second ratio. In a case where the transmission ratio is increased, the rotational torque required for rotation of the input rotational shaft increases. In this case, the human-powered vehicle control device according to the fourth aspect increases the maximum value of the output of the motor to limit increases in the load on the user that the user feels.

In accordance with a fifth aspect of the present disclosure, the human-powered vehicle control device according to any one of the first to fourth aspects is configured so that the electronic controller is configured to control the motor to change the first changing ratio of the increase rate of the output of the motor to the increase rate of the human driving force in accordance with the transmission information. The electronic controller is configured to control the motor to decrease the first changing ratio of the increase rate of the output of the motor to the increase rate of the human driving force in a case where the transmission ratio is less than a third ratio from the first changing ratio of the increase rate of the output of the motor to the increase rate of the human driving force in a case where the transmission ratio is greater than or equal to the third ratio. In a case where the transmission ratio is decreased, the rotational torque of the wheel based on the human driving force increases. In this case, the human-powered vehicle control device according to the fifth aspect decreases the first changing ratio of the increase rate of the output of the motor to the increase rate of the human driving force so that the rotational torque of the wheel does not increase in excess.

In accordance with a sixth aspect of the present disclosure, the human-powered vehicle control device according to any one of the first to fifth aspects is configured so that the electronic controller is configured to control the motor to change the first changing ratio of the increase rate of the output of the motor to the increase rate of the human driving force in accordance with the transmission information. The electronic controller is configured to control the motor to increase the first changing ratio of the increase rate of the output of the motor to the increase rate of the human driving force in a case where the transmission ratio is greater than a fourth ratio from the first changing ratio of the increase rate of the output of the motor to the increase rate of the human driving force in a case where the transmission ratio is less than or equal to the fourth ratio. In a case where the transmission ratio is increased, the rotational torque required for rotation of the input rotational shaft increases. In this case, the human-powered vehicle control device according to the sixth aspect increases the first changing ratio of the increase rate of the output of the motor to the increase rate of the human driving force to limit increases in the load on the user that the user feels.

In accordance with a seventh aspect of the present disclosure, the human-powered vehicle control device according to any one of the first to sixth aspects is configured so that the electronic controller is configured to control the motor to change the second changing ratio of the decrease rate of the output of the motor to the decrease rate of the human driving force in accordance with the transmission information. The electronic controller is configured to control the motor to increase the second changing ratio of the decrease rate of the output of the motor to the decrease rate of the human driving force in a case where the transmission ratio is less than a fifth ratio from the second changing ratio of the decrease rate of the output of the motor to the decrease rate of the human driving force in a case where the transmission ratio is greater than or equal to the fifth ratio. In a case where the transmission ratio is decreased, the rotational torque of the wheel based on the human driving force increases. In this case, the human-powered vehicle control device according to the seventh aspect increases the second changing ratio of the decrease rate of the output of the motor to the decrease rate of the human driving force. This allows the user to control the vehicle easily.

In accordance with an eighth aspect of the present disclosure, the human-powered vehicle control device according to any one of the first to seventh aspects is configured so that the electronic controller is configured to control the motor to change the second changing ratio of the decrease rate of the output of the motor to the decrease rate of the human driving force in accordance with the transmission information. The electronic controller is configured to control the motor to increase the second changing ratio of the decrease rate of the output of the motor to the decrease rate of the human driving force in a case where the transmission ratio is greater than a sixth ratio from the second changing ratio of the decrease rate of the output of the motor to the decrease rate of the human driving force in a case where the transmission ratio is less than or equal to the sixth ratio. In a case where the transmission ratio is increased, the rotational torque required for rotation of the input rotational shaft increases. In this case, the human-powered vehicle control device according to the eighth aspect increases the second changing ratio of the decrease rate of the output of the motor to the decrease rate of the human driving force to reduce the load on the user that the user feels.

In accordance with a ninth aspect of the present disclosure, the human-powered vehicle control device according to any one of the first to eighth aspects is configured so that the electronic controller is configured to control the motor so that a control state of the motor during a predetermined period from when the human-powered vehicle starts traveling differs from the control state of the motor after the predetermined period elapses. The human-powered vehicle control device according to the ninth aspect can obtain a suitable control state of the motor both during the predetermined period from when human-powered vehicle starts traveling and after the predetermined period elapses.

A human-powered vehicle control device in accordance with a tenth aspect of the present disclosure is for a human-powered vehicle. The human-powered vehicle control device comprises an electronic controller configured to control a motor that applies a propulsion force to the human-powered vehicle. The electronic controller is configured to control the motor in a first control state in at least one of a case where a rotational speed of an input rotational shaft of the human-powered vehicle is lower than or equal to a first rotational speed, a human driving force input to the human-powered vehicle is greater than or equal to a first driving force, and a transmission ratio in a power transmission path between the input rotational shaft and a wheel of the human-powered vehicle is equal to a seventh ratio and a case where the human-powered vehicle starts traveling and the transmission ratio is equal to the seventh ratio. The electronic controller is configured to control the motor in a second control state that differs from the first control state in at least one of a case where the rotational speed of the input rotational shaft is lower than or equal to the first rotational speed, the human driving force is greater than or equal to the first driving force, and the transmission ratio is equal to an eighth ratio differing from the seventh ratio and a case where the human-powered vehicle starts traveling and the transmission ratio is equal to the eighth ratio. The human-powered vehicle control device according to the tenth aspect can control the motor in a preferred manner in accordance with the transmission ratio both in a case where the human-powered vehicle starts traveling and a case where the rotational speed of the input rotational shaft of the human-powered vehicle is lower than or equal to the first rotational speed and the human driving force input to the human-powered vehicle is greater than or equal to the first driving force. Thus, the usability is improved.

In accordance with an eleventh aspect of the present disclosure, the human-powered vehicle control device according to the tenth aspect is configured so that the eighth ratio is greater than the seventh ratio. The electronic controller is configured to control the motor in accordance with the human driving force input to the human-powered vehicle to increase an assist ratio of an assist force produced by the motor to the human driving force in the second control state from the assist ratio in the first control state. In a case where the transmission ratio is increased, the rotational torque required for rotation of the input rotational shaft increases. In this case, the human-powered vehicle control device according to the eleventh aspect increases the assist ratio of the assist force produced by the motor to the human driving force to reduce the load on the user that the user feels.

In accordance with a twelfth aspect of the present disclosure, the human-powered vehicle control device according to the tenth or eleventh aspect is configured so that the eighth ratio is greater than the seventh ratio. The electronic controller is configured to control the motor in accordance with the human driving force input to the human-powered vehicle to increase a maximum value of an output of the motor in the second control state from the maximum value of the output of the motor in the first control state. In a case where the transmission ratio is increased, the rotational torque required for rotation of the input rotational shaft increases. In this case, the human-powered vehicle control device according to the twelfth aspect increases the maximum value of the output of the motor to reduce the load on the user that the user feels.

In accordance with a thirteenth aspect of the present disclosure, the human-powered vehicle control device according to any one of the tenth to twelfth aspects is configured so that the eighth ratio is greater than the seventh ratio. The electronic controller is configured to control the motor in accordance with the human driving force input to the human-powered vehicle to increase a first changing ratio of an increase rate of an output of the motor to an increase rate of the human driving force in the second control state from the first changing ratio of the increase rate of the output of the motor to the increase rate of the human driving force in the first control state. In a case where the transmission ratio is increased, the rotational torque required for rotation of the input rotational shaft increases. In this case, the human-powered vehicle control device according to the thirteenth aspect increases the first changing ratio of the increase rate of the output of the motor to the increase rate of the human driving force to reduce the load on the user that the user feels.

In accordance with a fourteenth aspect of the present disclosure, the human-powered vehicle control device according to any one of the tenth to thirteenth aspects is configured so that the eighth ratio is greater than the seventh ratio. The electronic controller is configured to control the motor in accordance with the human driving force input to the human-powered vehicle to decrease a second changing ratio of a decrease rate of an output of the motor to a decrease rate of the human driving force in the second control state from the second changing ratio of the decrease rate of the output of the motor to the decrease rate of the human driving force in the first control state. In a case where the transmission ratio is increased, the rotational torque required for rotation of the input rotational shaft increases. In this case, the human-powered vehicle control device according to the fourteenth aspect decreases the second changing ratio of the decrease rate of the output of the motor to the decrease rate of the human driving force to reduce the load on the user that the user feels.

In accordance with a fifteenth aspect of the present disclosure, the human-powered vehicle control device according to any one of the tenth to fourteenth aspects is configured so that the electronic controller is configured to control the motor in the second control state in a case where the rotational speed of the input rotational shaft of the human-powered vehicle is higher than the first rotational speed and the transmission ratio is equal to the seventh ratio or a case where the human driving force input to the human-powered vehicle is less than the first driving force and the transmission ratio is equal to the seventh ratio. The human-powered vehicle control device according to the fifteenth aspect changes from the first control state to the second control state in accordance with the rotational speed of the input rotational shaft of the human-powered vehicle or the human driving force input to the human-powered vehicle in a case where the transmission ratio is equal to the seventh ratio and the motor is controlled in the first control state. Thus, the motor is controlled in accordance with the traveling condition in a preferred manner.

A human-powered vehicle control device in accordance with a sixteenth aspect of the present disclosure is for a human-powered vehicle. The human-powered vehicle control device comprises an electronic controller configured to control a motor that applies a propulsion force to the human-powered vehicle. The electronic controller is configured to control the motor in a third control state in a case where a rotational speed of an input rotational shaft of the human-powered vehicle is lower than or equal to a first rotational speed, a human driving force input to the human-powered vehicle is greater than or equal to a first driving force, and an inclination angle of the human-powered vehicle is equal to a first angle. The electronic controller is configured to control the motor in a fourth control state that differs from the third control state in a case where the rotational speed of the input rotational shaft is lower than or equal to the first rotational speed, the human driving force is greater than or equal to the first driving force, and the inclination angle of the human-powered vehicle is equal to a second angle differing from the first angle. The human-powered vehicle control device according to the sixteenth aspect can control the motor in a preferred manner in accordance with the inclination angle of the human-powered vehicle in a case where the rotational speed of the input rotational shaft of the human-powered vehicle is lower than or equal to the first rotational speed and the human driving force input to the human-powered vehicle is greater than or equal to the first driving force. Thus, the usability is improved.

In accordance with a seventeenth aspect of the present disclosure, the human-powered vehicle control device according to the sixteenth aspect is configured so that the inclination angle is a pitch angle of the human-powered vehicle in a case where the human-powered vehicle is traveling uphill. The first angle is greater than the second angle. The electronic controller is configured to control the motor to increase a maximum value of an output of the motor in the third control state from the maximum value of the output of the motor in the fourth control state. In a case where the human-powered vehicle is traveling uphill, the load on the user that the user feels will increase as the pitch angle increases. In this case, the human-powered vehicle control device according to the seventeenth aspect increases the maximum value of the output of the motor as the pitch angle increases. This reduces the load on the user that the user feels.

In accordance with an eighteenth aspect of the present disclosure, the human-powered vehicle control device according to the sixteenth aspect is configured so that the inclination angle is a pitch angle of the human-powered vehicle in a case where the human-powered vehicle is traveling downhill. The first angle is greater than the second angle. The electronic controller is configured to control the motor to decrease a maximum value of an output of the motor in the third control state from the maximum value of the output of the motor in the fourth control state. In a case where the human-powered vehicle is traveling downhill, the load on the user that the user feels will decrease as the pitch angle increases. The human-powered vehicle control device according to the eighteenth aspect decreases the maximum value of the output of the motor as the pitch angle increases. This reduces consumption of electric power.

In accordance with a nineteenth aspect of the present disclosure, the human-powered vehicle control device according to the seventeenth or eighteenth aspect is configured so that the electronic controller is configured to control the motor in the fourth control state in a case where the rotational speed of the input rotational shaft is higher than the first rotational speed and the inclination angle is equal to the first angle or a case where the human driving force input to the human-powered vehicle is less than the first driving force and the inclination angle is equal to the first angle. The human-powered vehicle control device according to the nineteenth aspect changes from the third control state to the fourth control state in accordance with the rotational speed of the input rotational shaft or the human driving force input to the human-powered vehicle in a case where the inclination angle is equal to the first angle and the motor is controlled in the third control state. Thus, the motor is controlled in a preferred manner in accordance with the traveling condition.

A human-powered vehicle control device in accordance with a twentieth aspect of the present disclosure is for a human-powered vehicle. The human-powered vehicle control device comprises an electronic controller configured to control a motor that applies a propulsion force to the human-powered vehicle. The electronic controller is configured to control the motor in accordance with information related to an inclination angle of the human-powered vehicle and information related to a transmission ratio in a power transmission path between an input rotational shaft of the human-powered vehicle and a wheel of the human-powered vehicle. The human-powered vehicle control device according to the twentieth aspect controls the motor in accordance with both the information related to the inclination angle of the human-powered vehicle and the information related to the transmission ratio in the power transmission path between the input rotational shaft of the human-powered vehicle and the wheel of the human-powered vehicle. Thus, the motor is controlled in a preferred manner in accordance with the traveling condition, and the usability is improved.

In accordance with a twenty-first aspect of the present disclosure, the human-powered vehicle control device according to the twentieth aspect is configured so that the inclination angle of the human-powered vehicle is a pitch angle of the human-powered vehicle in a case where the human-powered vehicle is traveling uphill. The electronic controller is configured to control the motor to increase at least one of an assist ratio of an assist force produced by the motor to human driving force input to the human-powered vehicle, a maximum value of an output of the motor, and a first changing ratio of an increase rate of the output of the motor to an increase rate of the human driving force in a case where the transmission ratio is less than or equal to a ninth ratio and the inclination angle is greater than or equal to a third angle from a case where the transmission ratio is less than or equal to the ninth ratio and the inclination angle is less than the third angle or a case where the transmission ratio is greater than the ninth ratio and the inclination angle is greater than or equal to the third angle. In a case where the human-powered vehicle is traveling uphill, the load on the user that the user feels will increase as the pitch angle increases. In this case, if the pitch angle increases while the transmission ratio is less than or equal to the ninth ratio, the human-powered vehicle control device according to the twenty-first aspect will reduce the load on the user that the user feels by increasing at least one of the assist ratio of the assist force produced by the motor to the human driving force input to the human-powered vehicle, the maximum value of the output of the motor, and the first changing ratio of the increase rate of the output of the motor to the increase rate of the human driving force. In a case where the user decreases the transmission ratio from one greater than the ninth ratio to one less than or equal to the ninth ratio to reduce the load, the rotational torque required for rotation of the input rotational shaft decreases. In this case, the human-powered vehicle control device according to the twenty-first aspect further increases at least one of the assist ratio of the assist force produced by the motor to the human driving force input to the human-powered vehicle, the maximum value of the output of the motor, and the first changing ratio of the increase rate of the output of the motor to the increase rate of the human driving force so that the load on the user that the user feels is further reduced.

In accordance with a twenty-second aspect of the present disclosure, the human-powered vehicle control device according to the twentieth or twenty-first aspect is configured so that the inclination angle of the human-powered vehicle is a pitch angle of the human-powered vehicle in a case where the human-powered vehicle is traveling uphill. The electronic controller is configured to control the motor to decrease a second changing ratio of a decrease rate of an output of the motor to a decrease rate of the human driving force input to the human-powered vehicle in a case where the transmission ratio is less than or equal to a tenth ratio and the inclination angle is greater than or equal to a fourth angle from a case where the transmission ratio is less than or equal to the tenth ratio and the inclination angle is less than the fourth angle or a case where the transmission ratio is greater than the tenth ratio and the inclination angle is greater than or equal to the fourth angle. In a case where the human-powered vehicle is traveling uphill, the load on the user that the user feels will increase as the pitch angle increases. In this case, if the pitch angle increases while the transmission ratio is less than or equal to the tenth ratio, the human-powered vehicle control device according to the twenty-second aspect will reduce the load on the user that the user feels by decreasing the second changing ratio of the decrease rate of the output of the motor to the decrease rate of the human driving force input to the human-powered vehicle. In a case where the transmission ratio is decreased from one greater than the tenth ratio to one less than or equal to the tenth ratio, the rotational torque required for rotation of the input rotational shaft decreases. In this case, the human-powered vehicle control device according to the twenty-second aspect further decreases the second changing ratio of the decrease rate of the output of the motor to the decrease rate of the human driving force input to the human-powered vehicle to further reduce the load on the user that the user feels.

A human-powered vehicle control device in accordance with a twenty-third aspect of the present disclosure is for a human-powered vehicle. The human-powered vehicle control device comprises an electronic controller configured to control a motor that applies a propulsion force to the human-powered vehicle. The electronic controller is configured to control the motor in a fifth control state in a case where a rotational speed of an input rotational shaft of the human-powered vehicle is lower than or equal to a first rotational speed and a human driving force input to the human-powered vehicle is greater than or equal to a first driving force. The electronic controller is configured to control the motor in a sixth control state in a case where the rotational speed of the input rotational shaft is higher than the first rotational speed or the human driving force input is less than the first driving force. At least one of a maximum value of an output of the motor, a first changing ratio of an increase rate of the output of the motor to an increase rate of the human driving force, and a second changing ratio of a decrease rate of the output of the motor to a decrease rate of the human driving force differs between the fifth control state and the sixth control state. The human-powered vehicle control device according to the twenty-third aspect can control the motor in a preferred manner both in a case where the rotational speed of the input rotational shaft of the human-powered vehicle is lower than or equal to the first rotational speed and the human driving force input to the human-powered vehicle is greater than or equal to the first driving force and a case where the rotational speed of the input rotational shaft is higher than the first rotational speed or the human driving force is less than the first driving force. Thus, the usability is improved.

A human-powered vehicle control device in accordance with a twenty-fourth aspect is for a human-powered vehicle. The human-powered vehicle control device comprises an electronic controller configured to control a motor that applies a propulsion force to the human-powered vehicle. The electronic controller is configured to control the motor in a seventh control state in a case where a rotational speed of an input rotational shaft of the human-powered vehicle is lower than or equal to a first rotational speed, a human driving force input to the human-powered vehicle is greater than or equal to a first driving force, and acceleration in a moving direction of the human-powered vehicle is less than a first acceleration. The electronic controller is configured to control the motor in an eighth control state that differs from the seventh control state in at least one of a case where the rotational speed of the input rotational shaft is higher than the first rotational speed, the human driving force is less than the first driving force, and the acceleration is greater than or equal to a first acceleration. The human-powered vehicle control device according to the twenty-fourth aspect can control the motor in a preferred manner both in a case where the rotational speed of the input rotational shaft of the human-powered vehicle is lower than or equal to the first rotational speed, the human driving force input to the human-powered vehicle is greater than or equal to the first driving force, and the acceleration in a moving direction of the human-powered vehicle is less than the first acceleration and a case where the rotational speed of the input rotational shaft is higher than the first rotational speed, the human driving force is less than the first driving force, and the acceleration is greater than or equal to the first acceleration. Thus, the usability is improved.

In accordance with a twenty-fifth aspect of the present disclosure, the human-powered vehicle control device according to the twenty-fourth aspect is configured so that the electronic controller is configured to control the motor so that at least one of an assist ratio of an assist force produced by the motor to the human driving force, a maximum value of an output of the motor, a first changing ratio of an increase rate of the output of the motor to an increase rate of the human driving force, and a second changing ratio of a decrease rate of the output of the motor to a decrease rate of the human driving force differs between the seventh control state and the eighth control state. The human-powered vehicle control device according to the twenty-fifth aspect can control the motor so that at least one of the assist ratio of the assist force produced by the motor to the human driving force, the maximum value of the output of the motor, the first changing ratio of the increase rate of the output of the motor to the increase rate of the human driving force, and the second changing ratio of the decrease rate of the output of the motor to the decrease rate of the human driving force is a suitable value in both the seventh control state and the eighth control state. Thus, the usability is improved.

In accordance with a twenty-sixth aspect of the present disclosure, the human-powered vehicle control device according to the twenty-fifth aspect is configured so that the electronic controller is configured to control the motor to increase at least one of the assist ratio of the assist force produced by the motor to the human driving force, the maximum value of the output of the motor, and the first changing ratio of the increase rate of the output of the motor to the increase rate of the human driving force in the seventh control state from the eighth control state. The human-powered vehicle control device according to the twenty-sixth aspect can increase at least one of the assist ratio of the assist force produced by the motor to the human driving force, the maximum value of the output of the motor, and the first changing ratio of the increase rate of the output of the motor to the increase rate of the human driving force in the seventh control state from the eighth control state.

In accordance with a twenty-seventh aspect of the present disclosure, the human-powered vehicle control device according to the twenty-fifth or twenty-sixth aspect is configured so that the electronic controller is configured to control the motor to decrease the second changing ratio of the decrease rate of the output of the motor to the decrease rate of the human driving force in the seventh control state from the eighth control state. The human-powered vehicle control device according to the twenty-seventh aspect can decrease the second changing ratio of the decrease rate of the output of the motor to the decrease rate of the human driving force in the seventh control state from the eighth control state.

A human-powered vehicle control device in accordance with a twenty-eighth aspect of the present disclosure is for a human-powered vehicle. The human-powered vehicle control device comprises an electronic controller configured to control a motor that applies a propulsion force to the human-powered vehicle. The electronic controller is configured to control the motor in a ninth control state in a case where a rotational speed of an input rotational shaft of the human-powered vehicle is lower than or equal to a second rotational speed and a human driving force input to the human-powered vehicle is greater than or equal to 40 Nm. The electronic controller is configured to control the motor in a tenth control state that differs from the ninth control state in a case where the rotational speed of the input rotational shaft is higher than the second rotational speed or the human driving force is less than 40 Nm. The human-powered vehicle control device according to the twenty-eighth aspect can control the motor in a preferred manner both in a case where the rotational speed of the input rotational shaft of the human-powered vehicle is lower than or equal to the second rotational speed and the human driving force input to the human-powered vehicle is greater than or equal to 40 Nm and a case where the rotational speed of the input rotational shaft is higher than the second rotational speed or the human driving force is less than 40 Nm. Thus, the usability is improved.

In accordance with a twenty-ninth aspect of the present disclosure, the human-powered vehicle control device according to the twenty-eighth aspect is configured so that the electronic controller is configured to control the motor so that at least one of an assist ratio of an assist force produced by the motor to the human driving force, a maximum value of an output of the motor, a first changing ratio of an increase rate of the output of the motor to an increase rate of the human driving force, and a second changing ratio of a decrease rate of the output of the motor to a decrease rate of the human driving force differs between the ninth control state and the tenth control state. The human-powered vehicle control device according to the twenty-ninth aspect can control the motor so that at least one of the assist ratio of the assist force produced by the motor to the human driving force, the maximum value of the output of the motor, the first changing ratio of the increase rate of the output of the motor to the increase rate of the human driving force, and the second changing ratio of the decrease rate of the output of the motor to the decrease rate of the human driving force is a suitable value in both the ninth control state and the tenth control state. Thus, the usability is improved.

In accordance with a thirtieth aspect of the present disclosure, the human-powered vehicle control device according to the twenty-ninth aspect is configured so that the electronic controller is configured to control the motor to increase at least one of the assist ratio of the assist force produced by the motor to the human driving force, the maximum value of the output of the motor, and the first changing ratio of the increase rate of the output of the motor to the increase rate of the human driving force in the ninth control state from the tenth control state. The human-powered vehicle control device according to the thirtieth aspect can increase at least one of the assist ratio of the assist force produced by the motor to the human driving force, the maximum value of the output of the motor, and the first changing ratio of the increase rate of the output of the motor to the increase rate of the human driving force in the ninth control state from the tenth control state.

In accordance with a thirty-first aspect of the present disclosure, the human-powered vehicle control device according to the twenty-ninth or thirtieth aspect is configured so that the electronic controller is configured to control the motor to decrease the second changing ratio of the decrease rate of the output of the motor to the decrease rate of the human driving force in the ninth control state from the tenth control state. The human-powered vehicle control device according to the thirty-first aspect can decrease the second changing ratio of the decrease rate of the output of the motor to the decrease rate of the human driving force in the ninth control state from the tenth control state.

The human-powered vehicle control device in accordance with the present disclosure improves the usability.

BRIEF DESCRIPTION OF THE DRAWINGS

Referring now to the attached drawings which form a part of this original disclosure.

DETAILED DESCRIPTION OF EMBODIMENTS

Figure 1:
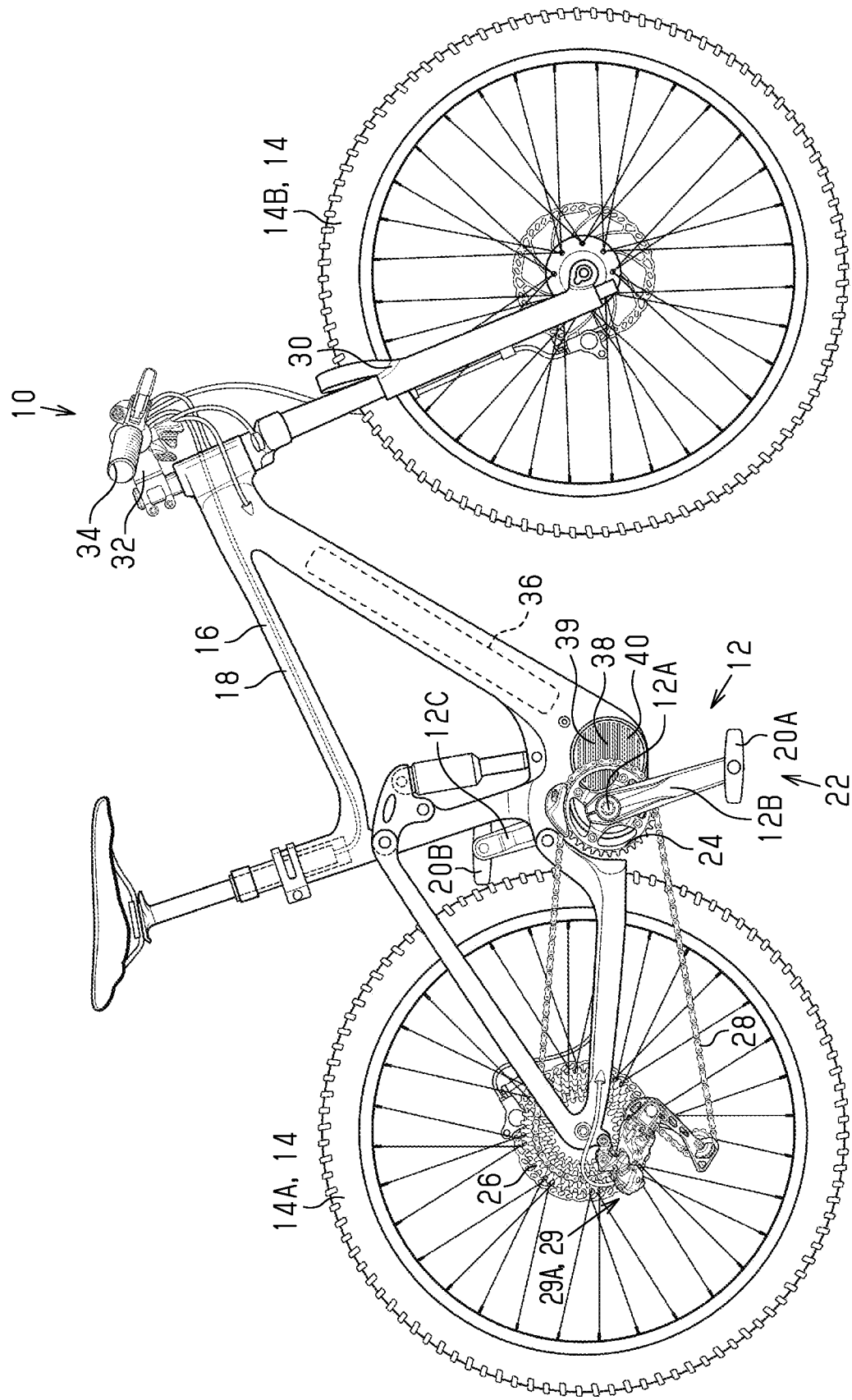
FIG. 1 is a side elevational view of a human-powered vehicle (e.g., a bicycle) including a human-powered vehicle control device in accordance with a first embodiment.
Figure 2:
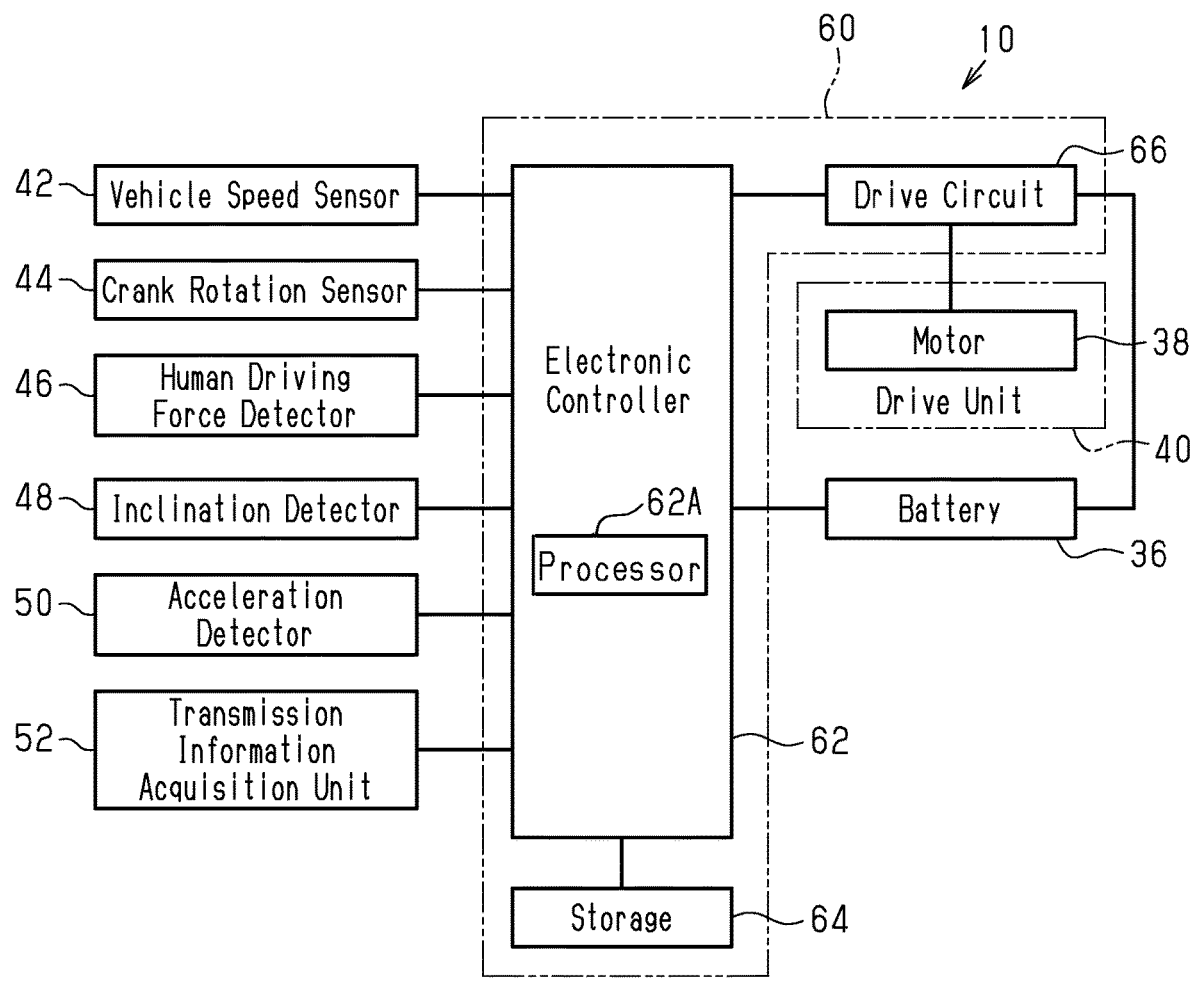
FIG. 2 is a block diagram showing the electrical configuration of the human-powered vehicle including the human-powered vehicle control device in accordance with the first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle control device 60 for a human-powered vehicle in accordance with a first embodiment will now be described with reference to FIGS. 1 to 4. A human-powered vehicle 10 is a vehicle that includes at least one wheel and can be driven by at least a human driving force H. Examples of the human-powered vehicle 10 include various types of bicycles such as a mountain bike, a road bike, a city bike, a cargo bike, a handcycle, and a recumbent bike. There is no limit to the number of wheels of the human-powered vehicle 10. The human-powered vehicle 10 also includes, for example, a unicycle or a vehicle having three or more wheels. The human-powered vehicle 10 is not limited to a vehicle that can be driven only by the human driving force H. The human-powered vehicle 10 includes an electric bicycle (E-bike) that uses drive force of an electric motor for a propulsion in addition to the human driving force H. The E-bike includes an electric assist bicycle that assists in propulsion with an electric motor. In the embodiment described hereafter, the human-powered vehicle 10 is an electric assist bicycle that is also a mountain bike.

The human-powered vehicle 10 includes a crank 12 to which the human driving force H is input. The human-powered vehicle 10 further includes a wheel 14 and a vehicle body 16. The wheel 14 includes a rear wheel 14A and a front wheel 14B. The vehicle body 16 includes a frame 18. The crank 12 includes an input rotational shaft 12A, a first crank arm 12B, and a second crank arm 12C. The input rotational shaft 12A is rotatable relative to the frame 18. The first crank arm 12B is provided on a first axial end of the input rotational shaft 12A, and the second crank arm 12C is provided on a second axial end of the input rotational shaft 12A. In the present embodiment, the input rotational shaft 12A is a crank axle. A first pedal 20A is connected to the first crank arm 12B. A second pedal 20B is connected to the second crank arm 12C.

The rear wheel 14A is driven by the rotation of the crank 12. The rear wheel 14A is supported by the frame 18. The crank 12 is connected to the rear wheel 14A by a drive mechanism 22. The drive mechanism 22 includes a first rotational body 24 connected to the input rotational shaft 12A. The input rotational shaft 12A and the first rotational body 24 can be coupled to rotate integrally with each other. Alternatively, the input rotational shaft 12A and the first rotational body 24 can be coupled by a first one-way clutch. The first one-way clutch is configured to rotate the first rotational body 24 forward in a case where the crank 12 is rotated forward and allow relative rotation of the crank 12 and the first rotational body 24 in a case where the crank 12 is rotated rearward. The first rotational body 24 includes a sprocket, a pulley, or a bevel gear. The drive mechanism 22 further includes a second rotational body 26 and a linking member 28. The linking member 28 transmits the rotational force of the first rotational body 24 to the second rotational body 26. The linking member 28 includes, for example, a chain, a belt, or a shaft.

The second rotational body 26 is coupled to the rear wheel 14A. The second rotational body 26 includes a sprocket, a pulley, or a bevel gear. Preferably, a second one-way clutch is provided between the second rotational body 26 and the rear wheel 14A. The second one-way clutch is configured to rotate the rear wheel 14A forward in a case where the second rotational body 26 is rotated forward and allow relative rotation of the second rotational body 26 and the rear wheel 14A in a case where the second rotational body 26 is rotated rearward. The human-powered vehicle 10 includes a transmission 29. The transmission 29 includes at least one of an external transmission device and an internal transmission device. The external transmission device includes, for example, a derailleur 29A, the first rotational body 24, and the second rotational body 26. The derailleur 29A includes at least one of a front derailleur and a rear derailleur. In a case where the derailleur 29A includes a front derailleur, the first rotational body 24 includes a plurality of sprockets. In a case where the derailleur 29A includes a rear derailleur, the second rotational body 26 includes a plurality of sprockets. An internal transmission device can be provided, for example, on a hub of the rear wheel 14A or in a power transmission path extending from the input rotational shaft 12A to the first rotational body 24. The transmission 29 can be operated by a Bowden cable or an electric actuator. A transmission operation device is provided on a handlebar 34. The transmission operation device includes a transmission lever or a transmission switch. The transmission operation device is connected to the transmission 29 by a Bowden cable or a communication cable. The transmission 29 and the transmission operation device can each include a wireless communication device to perform wireless communication with each other. The transmission 29 can be operated in accordance with operations of the transmission operation device by a user. Alternatively, the transmission 29 can be automatically operated by an electronic controller 62 or a different electronic controller in accordance with outputs of a sensor provided on the human-powered vehicle. In a case where the transmission 29 is operated by an electric actuator, the electric actuator can be included in the transmission 29. The transmission operation device includes, for example, a shift-up lever or a shift-up switch and a shift-down lever or a shift-down switch. The shift-up lever and the shift-up switch are for actuating the transmission 29 to increase a transmission ratio. The shift-down lever and the shift-down switch are for actuating the transmission 29 to decrease the transmission ratio. The transmission operation device can include a cylindrical member and actuate the transmission 29 by rotating the cylindrical member. The transmission operation device can have any configuration.

The front wheel 14B is attached to the frame 18 by a front fork 30. The handlebar 34 is connected to the front fork 30 by a stem 32. In the present embodiment, the rear wheel 14A is connected to the crank 12 by the drive mechanism 22. Alternatively, at least one of the rear wheel 14A and the front wheel 14B can be connected to the crank 12 by the drive mechanism 22.

Preferably, the human-powered vehicle 10 includes a battery 36. The battery 36 includes one or more battery cells. Each battery cell includes a rechargeable battery. The battery 36 is configured to supply the human-powered vehicle control device 60 with electric power. Preferably, the battery 36 is connected to the electronic controller 62 of the human-powered vehicle control device 60 via an electric cable or a wireless communication device in a manner allowing for communication. The battery 36 is configured to perform communication with the electronic controller 62 through, for example, power line communication (PLC), Controller Area Network (CAN), or Universal Asynchronous Receiver/Transmitter (UART).

The human-powered vehicle 10 includes a motor 38. The motor 38 is configured to apply a propulsion force to the human-powered vehicle 10. The motor 38 includes one or more electric motors. The electric motor is, for example, a brushless motor. The motor 38 is configured to transmit a rotational force to at least one of the front wheel 14B and a power transmission path of the human driving force H extending from the pedals 20A and 20B to the rear wheel 14A. The power transmission path of human driving force H from the pedals 20A and 20B to the rear wheel 14A includes the rear wheel 14A. In the present embodiment, the motor 38 is provided on the frame 18 of the human-powered vehicle 10, and is configured to transmit rotation to the first rotational body 24. Thus, the motor 38 constitutes an assist motor. The motor 38 is provided in a housing 39. The housing 39 is provided on the frame 18. The housing 39 is, for example, attached to the frame 18 in a detachable manner.

The motor 38 and the housing 39 on which the motor 38 is provided define a drive unit 40. The drive unit 40 can include a speed reducer connected to an output shaft of the motor 38. In the present embodiment, the housing 39 rotatably supports the input rotational shaft 12A. In the present embodiment, the drive unit 40 includes an output portion connected to the first rotational body 24. Preferably, the output portion is annular, provided coaxially with the input rotational shaft 12A, and extends around the circumference of the input rotational shaft 12A. The output portion is directly connected to the input rotational shaft 12A or connected via the first one-way clutch to the input rotational shaft 12A. The motor 38 is directly connected to the output portion or connected via the speed reducer to the output portion. Preferably, a third one-way clutch is provided in the power transmission path between the motor 38 and the input rotational shaft 12A to restrict transmission of the rotational force of the crank 12 to the motor 38 in a case where the input rotational shaft 12A is rotated in a direction in which the human-powered vehicle 10 moves forward. In a case where the motor 38 is provided on at least one of the rear wheel 14A and the front wheel 14B, the motor 38 can be provided on a hub and form a hub motor with the hub.

The human-powered vehicle control device 60 includes the electronic controller 62. The electronic controller 62 includes one or more processors 62A that execute predetermined control programs. The processors include, for example, a central processing unit (CPU) or a micro-processing unit (MPU). The processors can be located at separate positions. The electronic controller 62 can include one or more microcomputers. Preferably, the human-powered vehicle control device 60 further includes storage 64. The storage 64 stores information used for control programs and control processes. The storage 64 includes any computer storage device or any non-transitory computer-readable medium with the sole exception of a transitory, propagating signal. For example, the storage 84 includes a nonvolatile memory and a volatile memory. The non-volatile memory includes, for example, at least one of a read-only memory (ROM), an erasable programmable read-only memory (EPROM), an electrically erasable programmable read-only memory (EEPROM), and a flash memory. The volatile memory includes, for example, a random-access memory (RAM). Preferably, the electronic controller 62 at least includes a timer or a counter.

Preferably, the human-powered vehicle control device 60 further includes a drive circuit 66 of the motor 38. Preferably, the drive circuit 66 and the electronic controller 62 are provided in the housing 39 of the drive unit 40. The drive circuit 66 and the electronic controller 62 can be, for example, provided on the same circuit board. The drive circuit 66 includes an inverter circuit. The drive circuit 66 controls the electric power supplied from the battery 36 to the motor 38. The drive circuit 66 is connected to the electronic controller 62 via a conductive wire, an electric cable, a wireless communication device, or the like. The drive circuit 66 drives the motor 38 in accordance with control signals from the electronic controller 62.

Preferably, the human-powered vehicle 10 further includes a vehicle speed sensor 42. Preferably, the human-powered vehicle 10 further includes at least one of a crank rotation sensor 44, a human driving force detector 46, an inclination detector 48, and an acceleration detector 50. The terms "sensor" and as "detector" used herein refers to a hardware device or instrument designed to detect the presence or absence of a particular event, object, substance, or a change in its environment, and to emit a signal in response. The terms "sensor" and as "detector" as used herein does not include a human.

The vehicle speed sensor 42 is configured to detect information related to the vehicle speed V of the human-powered vehicle 10. In the present embodiment, the vehicle speed sensor 42 is configured to detect information related to the rotational speed W of the wheel 14 of the human-powered vehicle 10. The vehicle speed sensor 42 is, for example, configured to detect a magnet provided on the wheel 14 of the human-powered vehicle 10. The vehicle speed sensor 42 is, for example, configured to output a predetermined number of detection signals during a period in which the wheel 14 completes one rotation. The predetermined number is, for example, one. The vehicle speed sensor 42 outputs a signal corresponding to the rotational speed W of the wheel 14. The electronic controller 62 can calculate the vehicle speed V of the human-powered vehicle 10 based on information corresponding to the rotational speed W of the wheel 14 and information related to the circumferential length of the wheel 14. The information related to the circumferential length of the wheel 14 is stored in the storage 64.

The vehicle speed sensor 42 includes, for example, a magnetic sensor such as a magnetic reed that forms a reed switch or a Hall element. The vehicle speed sensor 42 can be mounted on a chain stay of the frame 18 of the human-powered vehicle 10 and configured to detect a magnet mounted on the rear wheel 14A or provided on the front fork 30 and configured to detect a magnet mounted on the front wheel 14B. In the present embodiment, the vehicle speed sensor 42 is configured so that a reed switch detects a magnet whenever the wheel 14 rotates once. The vehicle speed sensor 42 can have any configuration as long as information related to the vehicle speed V of the human-powered vehicle 10 can be obtained. For example, the vehicle speed sensor 42 does not have to be configured to detect the magnet provided on the wheel 14 and can be configured to detect a slit provided in a disc brake. Alternatively, the vehicle speed sensor can include a global positioning system (GPS) receiver, an optical sensor, or the like. In a case where the vehicle speed sensor 42 includes a GPS receiver, the electronic controller 62 can calculate the vehicle speed V from the time and the distance moved. The vehicle speed sensor 42 is connected to the electronic controller 62 via a wireless communication device or an electric cable.

The crank rotation sensor 44 is configured to detect information related to rotational speed C of the input rotational shaft 12A. The crank rotation sensor 44 is provided on, for example, the frame 18 of the human-powered vehicle 10 or the drive unit 40 of the human-powered vehicle 10. The crank rotation sensor 44 includes a magnetic sensor that outputs signals corresponding to the strength of the magnetic field. A ring-shaped magnet of which the magnetic field changes in a circumferential direction is provided on the input rotational shaft 12A, a member that is rotated in cooperation with the input rotational shaft 12A, or in the power transmission path from the input rotational shaft 12A to the first rotational body 24. The member that is rotated in cooperation with the input rotational shaft 12A can include the output shaft of the motor 38.

The crank rotation sensor 44 outputs signals corresponding to the rotational speed C of the input rotational shaft 12A. For example, in a case where the first one-way clutch is not provided between the input rotational shaft 12A and the first rotational body 24, the magnet can be provided on the first rotational body 24. The crank rotation sensor 44 can have any configuration as long as information related to the rotational speed C of the input rotational shaft 12A can be obtained. Instead of or in addition to the magnetic sensor, the crank rotation sensor 44 can include an optical sensor, an acceleration sensor, a gyro sensor, a torque sensor, or the like. The crank rotation sensor 44 is connected to the electronic controller 62 via a wireless communication device or an electric cable.

The human driving force detector 46 is configured to detect information related to the human driving force H. The human driving force detector 46 includes, for example, a torque sensor. The torque sensor is configured to output signals corresponding to torque applied to the crank 12 by the human driving force H. For example, in a case where the first one-way clutch is provided in the power transmission path, it is preferred that the torque sensor be provided at an upstream side of the first one-way clutch in the power transmission path. The torque sensor includes a strain sensor, a magnetostrictive sensor, a pressure sensor, and the like. The strain sensor includes a strain gauge.

The torque sensor is provided near the power transmission path or a member included in the power transmission path. The member included in the power transmission path is, for example, the input rotational shaft 12A, a member that transmits the human driving force H between the input rotational shaft 12A and the first rotational body 24, the crank arms 12B and 12C, or the pedals 20A and 20B. The human driving force detector 46 is connected to the electronic controller 62 via a wireless communication device or an electric cable. The human driving force detector 46 can have any configuration as long as information related to the human driving force H can be obtained. For example, the human driving force detector 46 can include a sensor that detects the pressure applied to the pedals 20A and 20B, a sensor that detects the tension on the chain, and the like.

The inclination detector 48 is configured to detect information related to an inclination angle D of the human-powered vehicle 10. The inclination detector 48 is configured to detect the inclination angle D of the human-powered vehicle 10. The inclination angle D of the human-powered vehicle 10 is an inclination angle of the human-powered vehicle 10 in a moving direction. The inclination angle D of the human-powered vehicle 10 corresponds to a pitch angle of the human-powered vehicle 10. In an example, the inclination detector 48 includes an inclination sensor. The inclination sensor at least includes a gyro sensor or an acceleration sensor. In another example, the inclination detector 48 includes a GPS receiver. The electronic controller 62 can calculate the inclination angle D of the human-powered vehicle 10 in accordance with GPS information obtained by the GPS receiver and road gradient included in map information stored in advance in the storage 64. The inclination detector 48 is connected to the electronic controller 62 via a wireless communication device or an electric cable.

The acceleration detector 50 is configured to detect signals corresponding to acceleration S in a direction in which the human-powered vehicle 10 moves forward. The acceleration detector 50 includes an acceleration sensor. The acceleration detector 50 is connected to the electronic controller 62 via a wireless communication device or an electric cable. Instead of or the acceleration sensor, the acceleration detector 50 can include the vehicle speed sensor 42. In a case where the acceleration detector 50 includes the vehicle speed sensor 42, the electronic controller 62 obtains information related to acceleration in a direction in which the human-powered vehicle 10 moves forward by differentiating the vehicle speed V.

Preferably, the human-powered vehicle 10 further includes a transmission information acquisition unit 52. The transmission information acquisition unit 52 obtains information related to a transmission ratio R of the transmission 29 in the power transmission path between the input rotational shaft 12A and the wheel 14. The transmission information can include information related to the shift stage of the transmission 29. The transmission information acquisition unit 52 is connected to the electronic controller 62 via a wireless communication device or an electric cable. For example, the transmission information acquisition unit 52 includes a first sensor that outputs a signal corresponding to at least one of an action of part of the transmission 29, an action of a Bowden cable, and an action of the transmission operation device. In a case where the transmission 29 is operated by an electric actuator, the transmission information acquisition unit 52 can include a second sensor that outputs a signal corresponding to at least one of an action of the electric actuator and an action of the speed reducer, which is connected to the electric actuator. The first sensor includes, for example, a magnetic sensor, an optical sensor, or a potentiometer. The second sensor includes, for example, a magnetic sensor, an optical sensor, or a potentiometer.

In a case where the transmission 29 includes the derailleur 29A, for example, the first sensor outputs at least one of signals indicating the position of a movable member of the derailleur 29A relative to the frame 18 and signals indicating the rotational phase of the movable member. The movable member includes, for example, a chain guide. In a case where the transmission 29 includes an electric transmission, the transmission information acquisition unit 52 can obtain operation signals of the transmission operation device as the transmission information. The electronic controller 62 receives the transmission information obtained by the transmission information acquisition unit 52. The electronic controller 62 identifies the present transmission ratio from the transmission information and information such as tables and relational expressions. The electronic controller 62 can identify the present transmission stage without identifying the present transmission ratio. The corresponding relationship of the transmission ratio and the transmission stage can be stored in the storage 64. The transmission information acquisition unit 52 can include the vehicle speed sensor 42, the crank rotation sensor 44, and the human driving force detector 46. The electronic controller 62 can identify the present transmission ratio by calculating a ratio of the rotational speed of the wheel detected by the vehicle speed sensor 42 to the rotational speed of the crank detected by the crank rotation sensor 44 in a case where the human driving force detected by the human driving force detector 46 is greater than or equal to a predetermined value.

The electronic controller 62 is configured to control the motor 38 that applies a propulsion force to the human-powered vehicle 10. The electronic controller 62 is configured to control the motor 38 in accordance with the human driving force H input to the human-powered vehicle 10. The human driving force H can be expressed in torque or power. In a case where the human driving force H is expressed in power, the human driving force H can be obtained by multiplying the torque detected by the human driving force detector 46 and the rotational speed C of the input rotational shaft 12A detected by the crank rotation sensor 44.

In a case where an output M of the motor 38 is less than or equal to a maximum value MX, for example, the electronic controller 62 is configured to control the motor 38 so that an assist ratio of an assist force produced by the motor 38 to the human driving force H is equal to a predetermined assist ratio A. The predetermined assist ratio A does not have to be a constant value. For example, the predetermined assist ratio A can be changed in accordance with the human driving force H, the vehicle speed V, or both of the human driving force H and the vehicle speed V. The human driving force H and the assist force can be expressed in torque or power. The assist ratio A is equal to a ratio of a propulsion force of the human-powered vehicle produced by the assist force of the motor 38 to a propulsion force of the human-powered vehicle 10 produced by the human driving force H.

The electronic controller 62 is configured to control the motor 38, for example, in a control state selected from a number of control states between which the corresponding relationship of the human driving force H and the predetermined assist ratio A at least partially varies. The control states include control modes. The electronic controller 62 is configured to output control instructions to the drive circuit 66 of the motor 38 in accordance with the human driving force H. The control instruction includes, for example, a torque instruction value. The control states can include a control state in which the motor 38 is not driven.

The electronic controller 62 is configured to control the motor 38 so that the assist force is less than or equal to an upper limit value MTX. In a case where the output M of the motor 38 is input to the first rotational body 24 and the assist force is expressed in torque, the electronic controller 62 is configured to control the motor 38 so that torque MT at the output portion of the drive unit 40 is less than or equal to the upper limit value MTX. Preferably, the upper limit value MTX is in a range of 30 Nm or greater and 200 Nm or less. The upper limit value MTX is, for example, 85 Nm. The upper limit value MTX is, for example, determined by a characteristic of the output M of the motor 38. In a case where the output M of the motor 38 is input to the first rotational body 24 and the assist force is expressed in power, the electronic controller 62 is configured to control the motor 38 so that the power at the output portion of the drive unit 40 is less than or equal to an upper limit value MWX.

The electronic controller 62 is configured to control the motor 38 to change at least one of the maximum value MX of the output M of the motor 38, a first changing ratio P1 of an increase rate of the output M of the motor 38 to an increase rate of the human driving force H, and a second changing ratio P2 of a decrease rate of the output M of the motor 38 to a decrease rate of the human driving force H in accordance with the transmission information related to the transmission ratio R in the power transmission path between the input rotational shaft 12A of the human-powered vehicle 10 and the wheel 14 of the human-powered vehicle 10. The transmission information is obtained by, for example, transmission information acquisition unit 52. Preferably, the electronic controller 62 is configured to control the motor 38 to change at least one of the maximum value MX of the output M of the motor 38, the first changing ratio P1 of the increase rate of the output M of the motor 38 to the increase rate of the human driving force H, and the second changing ratio P2 of the decrease rate of the output M of the motor 38 to the decrease rate of the human driving force H in correspondence with the transmission ratio R.

The electronic controller 62 changes the first changing ratio P1 with, for example, a first filter. The first filter includes, for example, a low pass filter having a first time constant. The electronic controller 62 changes the first changing ratio P1 by changing the first time constant. The electronic controller 62 can change the first changing ratio P1 by changing the gain for calculating the output M of the motor 38 from the human driving force H.

The electronic controller 62 changes the second changing ratio P2 with, for example, a second filter. The second filter includes, for example, a low pass filter having a second time constant. The electronic controller 62 changes the second changing ratio P2 by changing the second time constant. The electronic controller 62 can change the second changing ratio P2 by changing the gain for calculating the output M of the motor 38 from the human driving force H.

Preferably, the electronic controller 62 controls the motor 38 to change at least one of the maximum value MX of the output M of the motor 38, the first changing ratio P1 of the increase rate of the output M of the motor 38 to the increase rate of the human driving force H, and the second changing ratio P2 of the decrease rate of the output M of the motor 38 to the decrease rate of the human driving force H in correspondence with the transmission information in at least one of a case where the human-powered vehicle 10 starts traveling, a case where the rotational speed C of the input rotational shaft 12A is lower than or equal to a first rotational speed CX, a case where the vehicle speed V of the wheel 14 is lower than or equal to a first speed V1, and a case where the rotational speed C of the input rotational shaft 12A is lower than or equal to the first rotational speed CX and the human driving force H is greater than or equal to a first driving force HX. Preferably, the electronic controller 62 controls the motor 38 to change at least one of the maximum value MX, the first changing ratio P1, and the second changing ratio P2 in accordance with the transmission ratio R in at least one of a case where the human-powered vehicle 10 starts traveling, a case where the rotational speed C of the input rotational shaft 12A is lower than or equal to the first rotational speed CX, a case where the rotational speed W of the wheel 14 is lower than or equal to a second rotational speed CY, and a case where the rotational speed C of the input rotational shaft 12A is lower than or equal to the first rotational speed CX and the human driving force H is greater than or equal to the first driving force HX.

The electronic controller 62 controls the motor 38, for example, in an eleventh control state in at least one of a case where the rotational speed C of the input rotational shaft 12A is lower than or equal to the first rotational speed CX, a case where the vehicle speed V of the human-powered vehicle 10 is lower than or equal to the first speed V1, and a case where the rotational speed C of the input rotational shaft 12A is lower than or equal to the first rotational speed CX and the human driving force H is greater than or equal to the first driving force HX. The electronic controller 62 controls the motor 38, for example, in a twelfth control state in at least one of a case where the rotational speed C of the input rotational shaft 12A is higher than the first rotational speed CX, a case where the vehicle speed V of the human-powered vehicle 10 is higher than the first speed V1, and a case where the rotational speed C of the input rotational shaft 12A is higher than the first rotational speed CX and the human driving force H is less than the first driving force HX. The twelfth control state can include a control state in which the motor 38 is controlled irrelevant of the transmission information or a control state in which the motor 38 is controlled in accordance with the transmission information. The first rotational speed CX is a value greater than or equal to 5 rpm and less than or equal to 30 rpm, for example, 20 rpm. The first speed V1 is a value greater than or equal to 3 km/h and less than or equal to 10 km/h, for example, 7 km/h. In a case where the first driving force HX is expressed in torque, the first driving force HX is, for example, 40 Nm.

The electronic controller 62 can control the motor 38 so that a control state of the motor 38 during a predetermined period TX from when the human-powered vehicle 10 starts traveling differs from a control state of the motor 38 after the predetermined period TX elapses. The predetermined period TX can be, for example, a predetermined time length. The predetermined time length is, for example, greater than or equal to one second and less than or equal to sixty seconds.

The predetermined period TX does not have to be a predetermined time length and can correspond to, for example, at least one of a period from when the human-powered vehicle 10 starts traveling until when the rotational speed C of the input rotational shaft 12A becomes higher than the first rotational speed CX, a period from when the human-powered vehicle 10 starts traveling until when the vehicle speed V of the human-powered vehicle 10 becomes higher than the first speed V1, and a period from when the human-powered vehicle 10 starts traveling until when the rotational speed C of the input rotational shaft 12A becomes lower than or equal to the first rotational speed CX and the human driving force H becomes greater than or equal to the first driving force HX. The electronic controller 62 controls the motor 38 in the eleventh control state during the predetermined period TX from when the human-powered vehicle 10 starts traveling and controls the motor 38 in the twelfth control state after the predetermined period TX elapses. The electronic controller 62 measures time with, for example, a timer or a counter. The electronic controller 62 can include a clock.

The electronic controller 62 can control the motor 38 in the eleventh control state to change the maximum value MX of the output M of the motor 38 in accordance with the transmission information. The electronic controller 62 can control the motor 38 in the eleventh control state to change the first changing ratio P1 of the increase rate of the output M of the motor 38 to the increase rate of the human driving force H in accordance with the transmission information. The electronic controller 62 can control the motor 38 in the eleventh control state to change the second changing ratio P2 of the decrease rate of the output M of the motor 38 to the decrease rate of the human driving force H in accordance with the transmission information.

In the eleventh control state, the electronic controller 62 can control the motor 38 in accordance with one of first to twelfth examples. In the eleventh control state, the electronic controller 62 can control the motor 38 in a manner combining two or more of the first or second example, the third or fourth example, the fifth or sixth example, the seventh or eighth example, the ninth or tenth example, and the eleventh or twelfth example that remain technically consistent with one another.

In the first example, the electronic controller 62 controls the motor 38 to decrease the maximum value MX of the output M of the motor 38 in a case where the transmission ratio R is less than a first ratio R1 from the maximum value MX of the output M of the motor 38 in a case where the transmission ratio R is greater than or equal to the first ratio R1. In the second example, the electronic controller 62 controls the motor 38 to increase the maximum value MX of the output M of the motor 38 in a case where the transmission ratio R is less than the first ratio R1 from the maximum value MX of the output M of the motor 38 in a case where the transmission ratio R is greater than or equal to the first ratio R1.

In the third example, the electronic controller 62 controls the motor 38 to increase the maximum value MX of the output M of the motor 38 in a case where the transmission ratio R is greater than a second ratio R2 from the maximum value MX of the output M of the motor 38 in a case where the transmission ratio R is less than or equal to the second ratio R2. In the fourth example, the electronic controller 62 controls the motor 38 to decrease the maximum value MX of the output M of the motor 38 in a case where the transmission ratio R is greater than the second ratio R2 from the maximum value MX of the output M of the motor 38 in a case where the transmission ratio R is less than or equal to the second ratio R2.

In the fifth example, the electronic controller 62 controls the motor 38 to decrease the first changing ratio P1 of the increase rate of the output M of the motor 38 to the increase rate of the human driving force H in a case where the transmission ratio R is less than a third ratio R3 from the first changing ratio P1 of the increase rate of the output M of the motor 38 to the increase rate of the human driving force H in a case where the transmission ratio R is greater than or equal to the third ratio R3. In the sixth example in the eleventh control state, the electronic controller 62 controls the motor 38 to increase the first changing ratio P1 in a case where the transmission ratio R is less than the third ratio R3 from the first changing ratio P1 in a case where the transmission ratio R is greater than or equal to the third ratio R3.

In the seventh example, the electronic controller 62 controls the motor 38 to increase the first changing ratio P1 of the increase rate of the output M of the motor 38 to the increase rate of the human driving force H in a case where the transmission ratio R is greater than a fourth ratio R4 from the first changing ratio P1 of the increase rate of the output M of the motor 38 to the increase rate of the human driving force H in a case where the transmission ratio R is less than or equal to the fourth ratio R4. In the eighth example, the electronic controller 62 controls the motor 38 to decrease the first changing ratio P1 in a case where the transmission ratio R is greater than the fourth ratio R4 from the first changing ratio P1 in a case where the transmission ratio R is less than or equal to the fourth ratio R4.

In the ninth example, the electronic controller 62 controls the motor 38 to increase the second changing ratio P2 of the decrease rate of the output M of the motor 38 to the decrease rate of the human driving force H in a case where the transmission ratio R is less than a fifth ratio R5 from the second changing ratio P2 of the decrease rate of the output M of the motor 38 to the decrease rate of the human driving force H in a case where the transmission ratio R is greater than or equal to the fifth ratio R5. In the tenth example, the electronic controller 62 controls the motor 38 to decrease the second changing ratio P2 in a case where the transmission ratio R is less than the fifth ratio R5 from the second changing ratio P2 in a case where the transmission ratio R greater than or equal to the fifth ratio R5.

In the eleventh example, the electronic controller 62 controls the motor 38 to increase the second changing ratio P2 of the decrease rate of the output M of the motor 38 to the decrease rate of the human driving force H in a case where the transmission ratio R is greater than a sixth ratio R6 from the second changing ratio P2 of the decrease rate of the output M of the motor 38 to the decrease rate of the human driving force H in a case where the transmission ratio R is less than or equal to the sixth ratio R6. In the twelfth example, the electronic controller 62 controls the motor 38 to decrease the second changing ratio P2 in a case where the transmission ratio R is greater than the sixth ratio R6 from the second changing ratio P2 in a case where the transmission ratio R is less than or equal to the sixth ratio R6. Preferably, the sixth ratio R6 is greater than the fifth ratio R5.

The first to sixth ratios R1 to R6 are set to the transmission ratios that can be set by the transmission 29 excluding the minimal transmission ratio and the maximal transmission. Preferably, the first, third, and fifth ratios R1, R3, and R5 are set to the transmission ratios that can be set by the transmission 29 and less than the median transmission ratio between the minimal transmission ratio and the maximal transmission ratio. Preferably, the second, fourth, and sixth ratios R2, R4, and R6 are set to the transmission ratios that can be set by the transmission 29 and greater than the median transmission ratio between the minimal transmission ratio and the maximal transmission ratio.

The first ratio R1 can be equal to the third ratio R3. The second ratio R2 can be equal to the fourth ratio R4. The fifth ratio R5 can be equal to at least one of the first ratio R1 and the third ratio R3. The sixth ratio R6 can be equal to at least one of the second ratio R2 and the fourth ratio R4. Two or more of the first, third, and fifth ratios R1, R3, and R5 can be equal values. Alternatively, the first, third, and fifth ratios R1, R3, and R5 can differ from one another. Two or more of the second, fourth, and sixth ratios R2, R4, and R6 can be equal values. Alternatively, the second, fourth, and sixth ratios R2, R4, and R6 can differ from one another.

A process executed by the electronic controller 62 to control the motor 38 will now be described with reference to FIGS. 3 and 4. In a case where electric power is supplied to the electronic controller 62, the electronic controller 62 starts the process from step S11 of the flowchart shown in FIG. 3. In a case where the process of the flowchart shown in FIGS. 3 and 4 ends, the electronic controller 62 repeats the process from step S11 in predetermined cycles until the supply of electric power stops.

In step S11, the electronic controller 62 determines whether the human-powered vehicle 10 has started to travel. In a case where the human-powered vehicle 10 has not started traveling, the electronic controller 62 proceeds to step S12. The electronic controller 62 determines that the human-powered vehicle 10 started traveling in a case where the vehicle speed of the human-powered vehicle 10 increases from a standstill state based on output signals of the vehicle speed sensor 42. In a case where the human-powered vehicle 10 has started traveling, the electronic controller 62 proceeds to step S15.

In step S12, the electronic controller 62 determines whether the rotational speed C of the input rotational shaft 12A is lower than or equal to the first rotational speed CX. In a case where the rotational speed C of the input rotational shaft 12A is not lower than or equal to the first rotational speed CX, the electronic controller 62 proceeds to step S13. In a case where the rotational speed C of the input rotational shaft 12A is lower than or equal to the first rotational speed CX, the electronic controller 62 proceeds to step S15.

In step S13, the electronic controller 62 determines whether the vehicle speed V of the human-powered vehicle 10 is lower than or equal to the first speed V1. In a case where the vehicle speed V of the human-powered vehicle 10 is not lower than or equal to the first speed V1, the electronic controller 62 proceeds to step S14. In a case where the vehicle speed V of the human-powered vehicle 10 is lower than or equal to the first speed V1, the electronic controller 62 proceeds to step S15.

In step S14, the electronic controller 62 determines whether the rotational speed C of the input rotational shaft 12A is lower than or equal to the first rotational speed CX and the human driving force H is greater than or equal to the first driving force HX. In a case where the rotational speed C of the input rotational shaft 12A is not lower than or equal to the first rotational speed CX or a case where the human driving force H is not greater than or equal to the first driving force HX, the electronic controller 62 ends the process. In a case where the rotational speed C of the input rotational shaft 12A is lower than or equal to the first rotational speed CX and the human driving force H is greater than or equal to the first driving force HX, the electronic controller 62 proceeds to step S15.

In step S15, the electronic controller 62 controls the motor 38 in the eleventh control state and then proceeds to step S16. In step S16, the electronic controller 62 determines whether the rotational speed C of the input rotational shaft 12A is higher than the first rotational speed CX. In a case where the rotational speed C of the input rotational shaft 12A is not higher than the first rotational speed CX, the electronic controller 62 proceeds to step S17. In a case where the rotational speed C of the input rotational shaft 12A is higher than the first rotational speed CX, the electronic controller 62 proceeds to step S20.

In step S17, the electronic controller 62 determines whether the vehicle speed V of the human-powered vehicle 10 is higher than the first speed V1. In a case where the vehicle speed V of the human-powered vehicle 10 is not higher than the first speed V1, the electronic controller 62 proceeds to step S18. In a case where the vehicle speed V of the human-powered vehicle 10 is higher than the first speed V1, the electronic controller 62 proceeds to step S20.

In step S18, the electronic controller 62 determines whether the rotational speed C of the input rotational shaft 12A is higher than the first rotational speed CX or the human driving force H is less than the first driving force HX. In a case where the rotational speed C of the input rotational shaft 12A is not higher than the first rotational speed CX and the human driving force H is greater than or equal to the first driving force HX, the electronic controller 62 proceeds to step S19. In a case where the rotational speed C of the input rotational shaft 12A is higher than the first rotational speed CX or the human driving force H is less than the first driving force HX, the electronic controller 62 proceeds to step S20.

In step S19, the electronic controller 62 determines whether the predetermined period TX elapsed from when the human-powered vehicle 10 started traveling. In a case where the predetermined period TX has not elapsed from when the human-powered vehicle 10 started traveling, the electronic controller 62 proceeds to step S15. In a case where the predetermined period TX has elapsed from when the human-powered vehicle 10 started traveling, the electronic controller 62 proceeds to step S20.

In step S20, the electronic controller 62 controls the motor 38 in the twelfth control state and then ends the process. Preferably, the electronic controller 62 performs step S15 again subsequent to step S17. In the flowchart shown in FIGS. 3 and 4, any one, any two, or any three of steps S11 to S14 can be omitted. In the flowchart shown in FIGS. 3 and 4, any one, any two, or any three of steps S16, S17, and S19 can be omitted.

Figure 3:
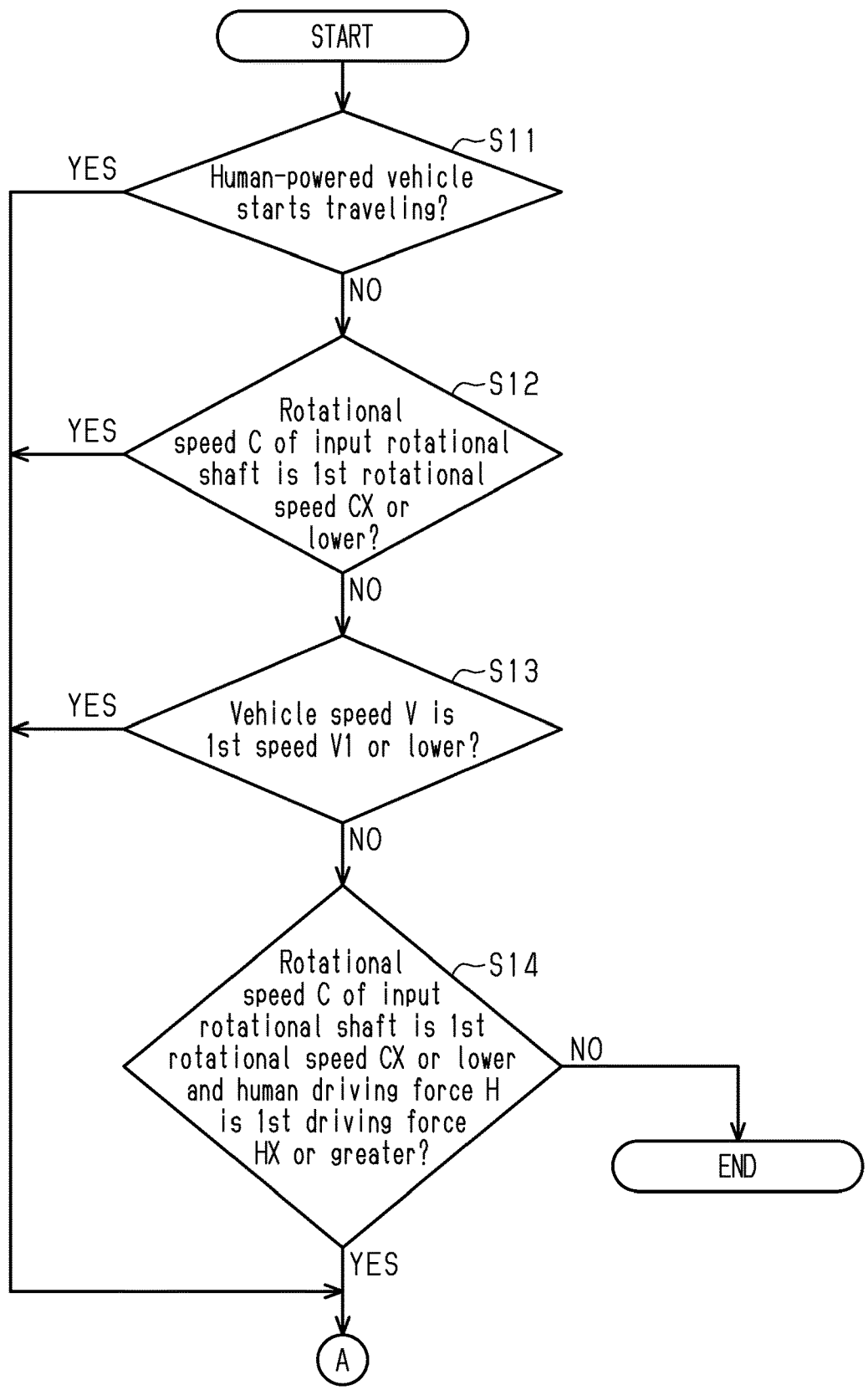
FIG. 3 is a flowchart illustrating a first part of a process executed by an electronic controller shown in FIG. 2 to control a motor.
Figure 4:
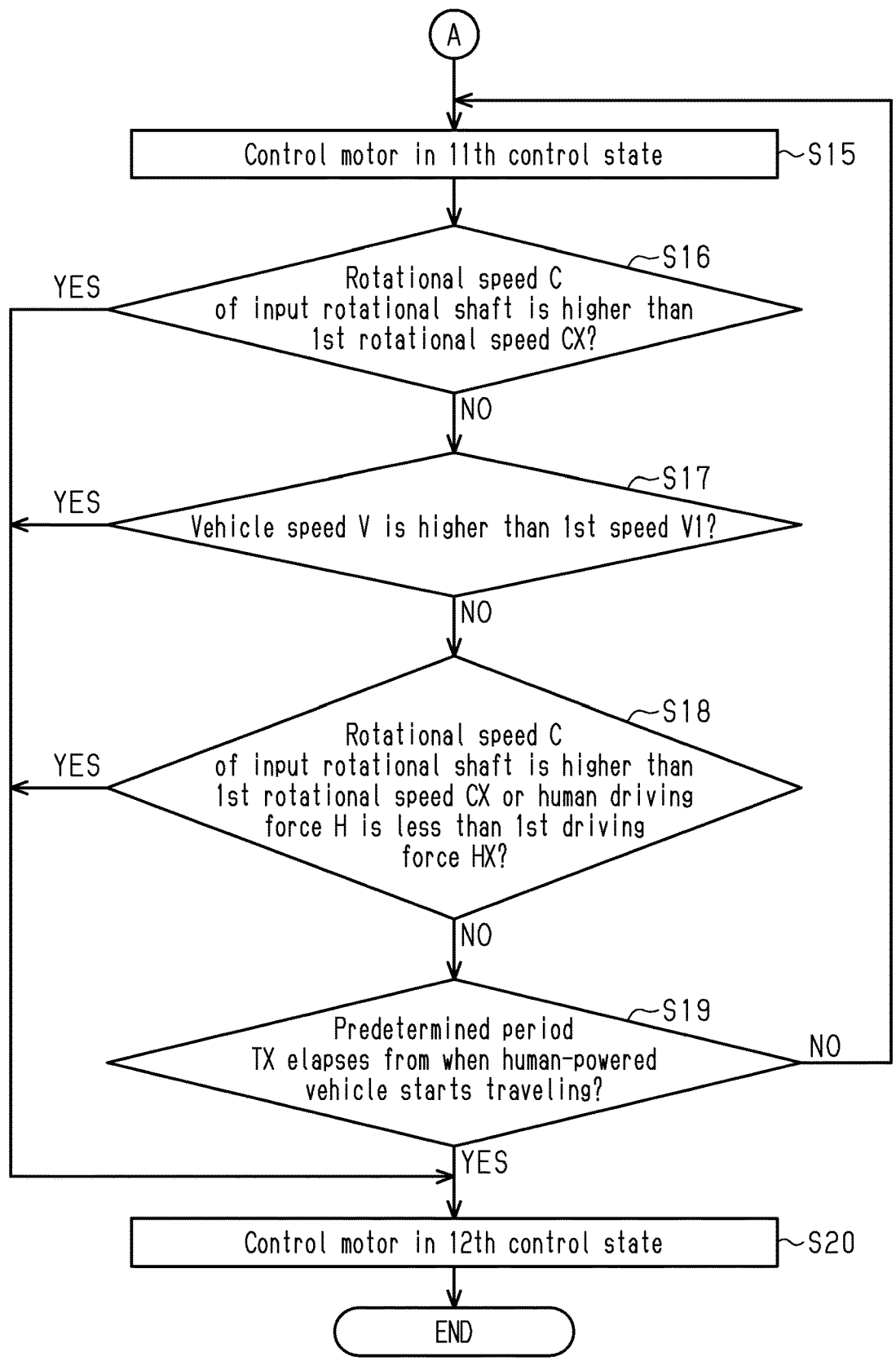
FIG. 4 is a flowchart illustrating a second part of the process executed by the electronic controller shown in FIG. 2 to control the motor.

In the flowchart of FIGS. 3 and 4, in case step S11 is omitted, step S19 can be omitted. In the flowchart of FIGS. 3 and 4, in case step S12 is omitted, step S16 can be omitted. In the flowchart of FIGS. 3 and 4, in case step S13 is omitted, step S17 can be omitted. In the flowchart of FIGS. 3 and 4, in case step S14 is omitted, step S18 can be omitted. In the flowchart of FIG. 3, steps S11 to S14 can be performed in any order. In the flowchart of FIGS. 3 and 4, steps S16 to S19 can be performed in any order.

Second Embodiment

Figure 5:
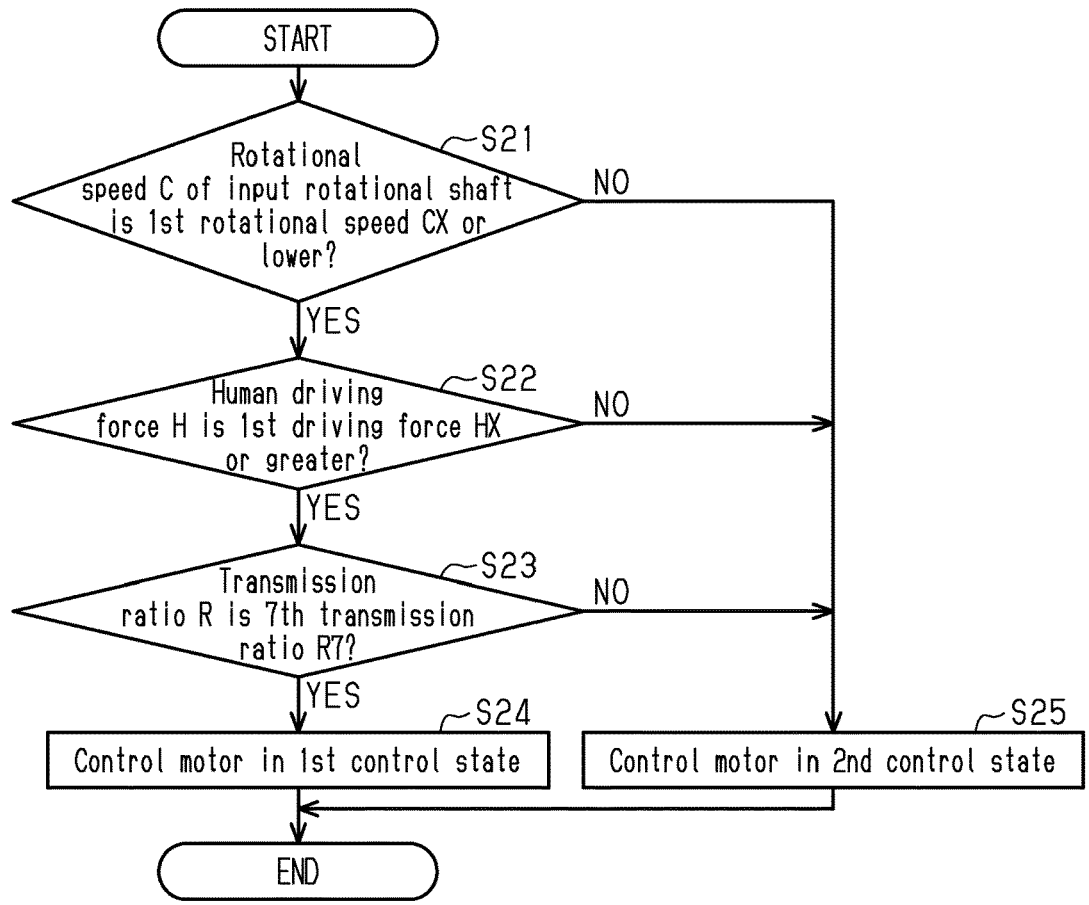
FIG. 5 is a flowchart illustrating a process executed by an electronic controller in accordance with a second embodiment to control a motor.
Figure 6:
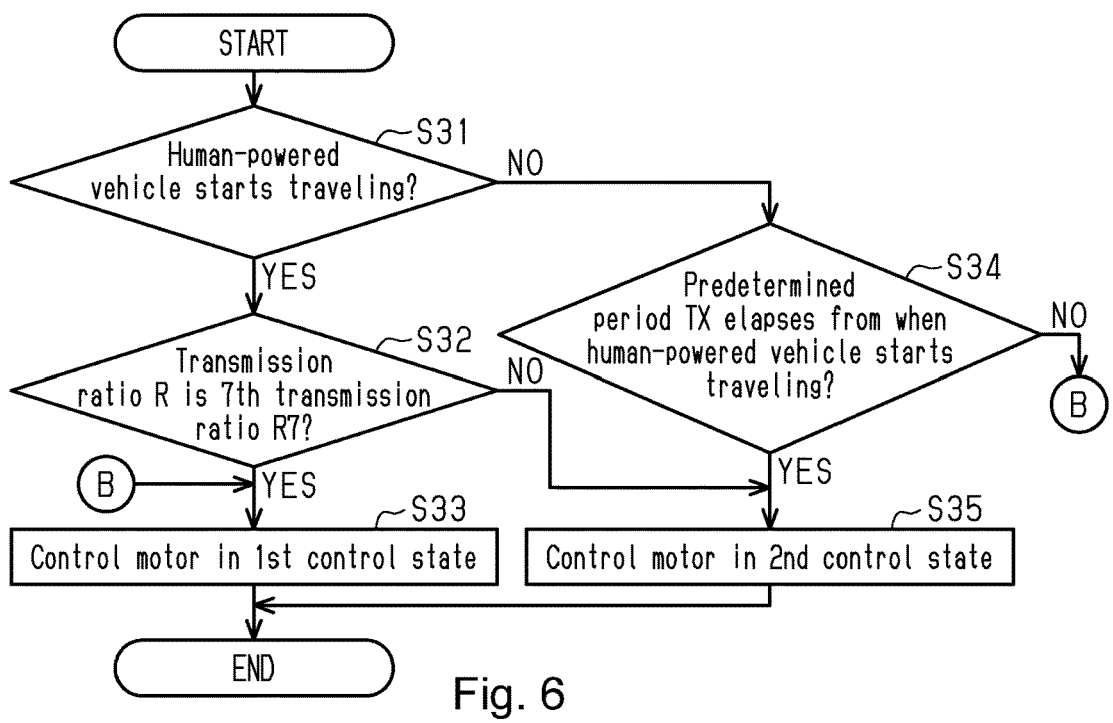
FIG. 6 is a flowchart illustrating another example of the process executed by the electronic controller in accordance with the second embodiment to control the motor.

The human-powered vehicle control device 60 in accordance with a second embodiment will now be described with reference to FIGS. 5 and 6. The human-powered vehicle control device 60 in the second embodiment is configured in the same manner as the human-powered vehicle control device 60 in the first embodiment except in that the flowchart shown in FIG. 5 or the flowchart shown in FIG. 6 is performed instead of the flowchart shown in FIGS. 3 and 4. Same reference numerals are given to those components in the human-powered vehicle control device 60 of the second embodiment that are the same as the corresponding components of the first embodiment. Such components will not be described in detail.

The electronic controller 62 controls the motor 38 in a first control state in at least one of a case where the rotational speed C of the input rotational shaft 12A of the human-powered vehicle 10 is lower than or equal to the first rotational speed CX, the human driving force H input to the human-powered vehicle 10 is greater than or equal to the first driving force HX, and the transmission ratio R in the power transmission path between the input rotational shaft 12A and the wheel 14 of the human-powered vehicle 10 is equal to a seventh ratio R7 and a case where the human-powered vehicle 10 starts traveling and the transmission ratio R is equal to the seventh ratio R7. The electronic controller 62 controls the motor 38 in a second control state that differs from the first control state in at least one of a case where the rotational speed C of the input rotational shaft 12A is lower than or equal to the first rotational speed CX, the human driving force H is greater than or equal to the first driving force HX, and the transmission ratio R is equal to an eighth ratio R8 differing from the seventh ratio R7 and a case where the human-powered vehicle 10 starts traveling and the transmission ratio R is equal to the eighth ratio R8.

Preferably, the electronic controller 62 controls the motor 38 in the second control state in a case where the rotational speed C of the input rotational shaft 12A of the human-powered vehicle 10 is higher than the first rotational speed CX and the transmission ratio R is equal to the seventh ratio R7 or a case where the human driving force H input to the human-powered vehicle 10 is less than the first driving force HX and the transmission ratio R is equal to the seventh ratio R7.

Preferably, the eighth ratio R8 is greater than the seventh ratio R7. The seventh ratio R7 can be equal to any one of the first to sixth ratios R1 to R6 in the first embodiment or differ from every one of the first to sixth ratios R1 to R6. Preferably, the seventh ratio R7 is equal to one of the first, third, and fifth ratios R1, R3, and R5 in the first embodiment. Preferably, the eighth ratio R8 includes every ratio R that is greater than the seventh ratio R7. Preferably, the seventh ratio R7 includes every ratio R that is less than the eighth ratio R8. Preferably, every transmission ratio R that is not the seventh ratio R7 is the eighth ratio R8.

In the first and second control states, the electronic controller 62 can control the motor 38 in accordance with one of thirteenth to twentieth examples. In the first and second control states, the electronic controller 62 can control the motor 38 in a manner combining two or more of the thirteenth or fourteenth example, the fifteenth or sixteenth example, the seventeenth or eighteenth example, and the nineteenth or twentieth example.

In the thirteenth example, the electronic controller 62 controls the motor 38 in accordance with the human driving force H input to the human-powered vehicle 10 to increase the assist ratio A of the assist force produced by the motor 38 to the human driving force H in the second control state from the assist ratio A in the first control state. In the fourteenth example, the electronic controller 62 controls the motor 38 in accordance with the human driving force H input to the human-powered vehicle 10 to decrease the assist ratio A in the second control state from the assist ratio A in the first control state.

In the fifteenth example, the electronic controller 62 controls the motor 38 in accordance with the human driving force H input to the human-powered vehicle 10 to increase the maximum value MX of the output M of the motor 38 in the second control state from the maximum value MX of the output M of the motor 38 in the first control state. In the sixteenth example, the electronic controller 62 controls the motor 38 in accordance with the human driving force H input to the human-powered vehicle 10 to decrease the maximum value MX of the output M of the motor 38 in the second control state from the maximum value MX of the output M of the motor 38 in the first control state.

In the seventeenth example, the electronic controller 62 controls the motor 38 in accordance with the human driving force H input to the human-powered vehicle 10 to increase the first changing ratio P1 of the increase rate of the output M of the motor 38 to the increase rate of the human driving force H in the second control state from the first changing ratio P1 of the increase rate of the output M of the motor 38 to the increase rate of the human driving force H in the first control state. In the eighteenth example, the electronic controller 62 controls the motor 38 in accordance with the human driving force H input to the human-powered vehicle 10 to decrease the first changing ratio P1 in the second control state from the first changing ratio P1 in the first control state.

In the nineteenth example, the electronic controller 62 controls the motor 38 in accordance with the human driving force H input to the human-powered vehicle 10 to decrease the second changing ratio P2 of the decrease rate of the output M of the motor 38 to the decrease rate of the human driving force H in the second control state from the second changing ratio P2 of the decrease rate of the output M of the motor 38 to the decrease rate of the human driving force H in the first control state. In the twentieth example, the electronic controller 62 controls the motor 38 in accordance with the human driving force H input to the human-powered vehicle 10 to increase the second changing ratio P2 in the second control state from the second changing ratio P2 in the first control state.

An example of a process executed by the electronic controller 62 to control the motor 38 will now be described with reference to FIG. 5. In a case where electric power is supplied to the electronic controller 62, the electronic controller 62 starts the process from step S21 of the flowchart shown in FIG. 5. In a case where the process of the flowchart shown in FIG. 5 ends, the electronic controller 62 repeats the process from step S21 in predetermined cycles until the supply of electric power stops.

In step S21, the electronic controller 62 determines whether the rotational speed C of the input rotational shaft 12A is lower than or equal to the first rotational speed CX. In a case where the rotational speed C of the input rotational shaft 12A is not lower than or equal to the first rotational speed CX in step S21, the electronic controller 62 proceeds to step S25. In step S25, the electronic controller 62 controls the motor 38 in the second control state and then ends the process. In step S21, in a case where the rotational speed C of the input rotational shaft 12A is lower than or equal to the first rotational speed CX, the electronic controller 62 proceeds to step S22.

In step S22, the electronic controller 62 determines whether the human driving force H is greater than or equal to the first driving force HX. In a case where the human driving force H is not greater than or equal to the first driving force HX, the electronic controller 62 proceeds to step S25. In step S25, the electronic controller 62 controls the motor 38 in the second control state and then ends the process. In step S22, in a case where the human driving force H is greater than or equal to the first driving force HX, the electronic controller 62 proceeds to step S23.

In step S23, the electronic controller 62 determines whether the transmission ratio R is equal to the seventh ratio R7. In a case where the transmission ratio R is not equal to the seventh ratio R7, the electronic controller 62 proceeds to step S25. In step S25, the electronic controller 62 controls the motor 38 in the second control state and then ends the process. In step S23, in a case where the transmission ratio R is equal to the seventh ratio R7, the electronic controller 62 proceeds to step S24. In step S24, the electronic controller 62 controls the motor 38 in the first control state and then ends the process. In the flowchart shown in FIG. 5, steps S21, S22, and S23 can be performed in any order.

Another example of the process executed by the electronic controller 62 to control the motor 38 will now be described with reference to FIG. 6. In a case where electric power is supplied to the electronic controller 62, the electronic controller 62 starts the process from step S31 of the flowchart shown in FIG. 6. In a case where the process of the flowchart shown in FIG. 6 ends, the electronic controller 62 repeats the process from step S31 in predetermined cycles until the supply of electric power stops.

In step S31, the electronic controller 62 determines whether the human-powered vehicle 10 has started to travel in the same manner as step S11 in FIG. 3. In a case where the human-powered vehicle 10 has not started traveling, the electronic controller 62 proceeds to step S34. In step S34, the electronic controller 62 determines whether the predetermined period TX elapsed from when the human-powered vehicle 10 started traveling in the same manner as step 19 in FIG. 4. In a case where the predetermined period TX has elapsed from when the human-powered vehicle 10 started traveling, the electronic controller 62 proceeds to step S35. In step S35, the electronic controller 62 controls the motor 38 in the second control state and then ends the process.

In step S34, in a case where the predetermined period TX has not elapsed from when the human-powered vehicle 10 started traveling, the electronic controller 62 proceeds to step S33. In step S31, in a case where the human-powered vehicle 10 has started traveling, the electronic controller 62 proceeds to step S32.

In step S32, the electronic controller 62 determines whether the transmission ratio R is equal to the seventh ratio R7. In a case where the transmission ratio R is not equal to the seventh ratio R7, the electronic controller 62 proceeds to step S35. In step S35, the electronic controller 62 controls the motor 38 in the second control state and then ends the process. In a case where the transmission ratio R is equal to the seventh ratio R7, the electronic controller 62 proceeds to step S33. In step S33, the electronic controller 62 controls the motor 38 in the first control state and then ends the process. In the flowchart shown in FIG. 6, steps S31 and S32 can be performed in any order.

Third Embodiment

Figure 7:
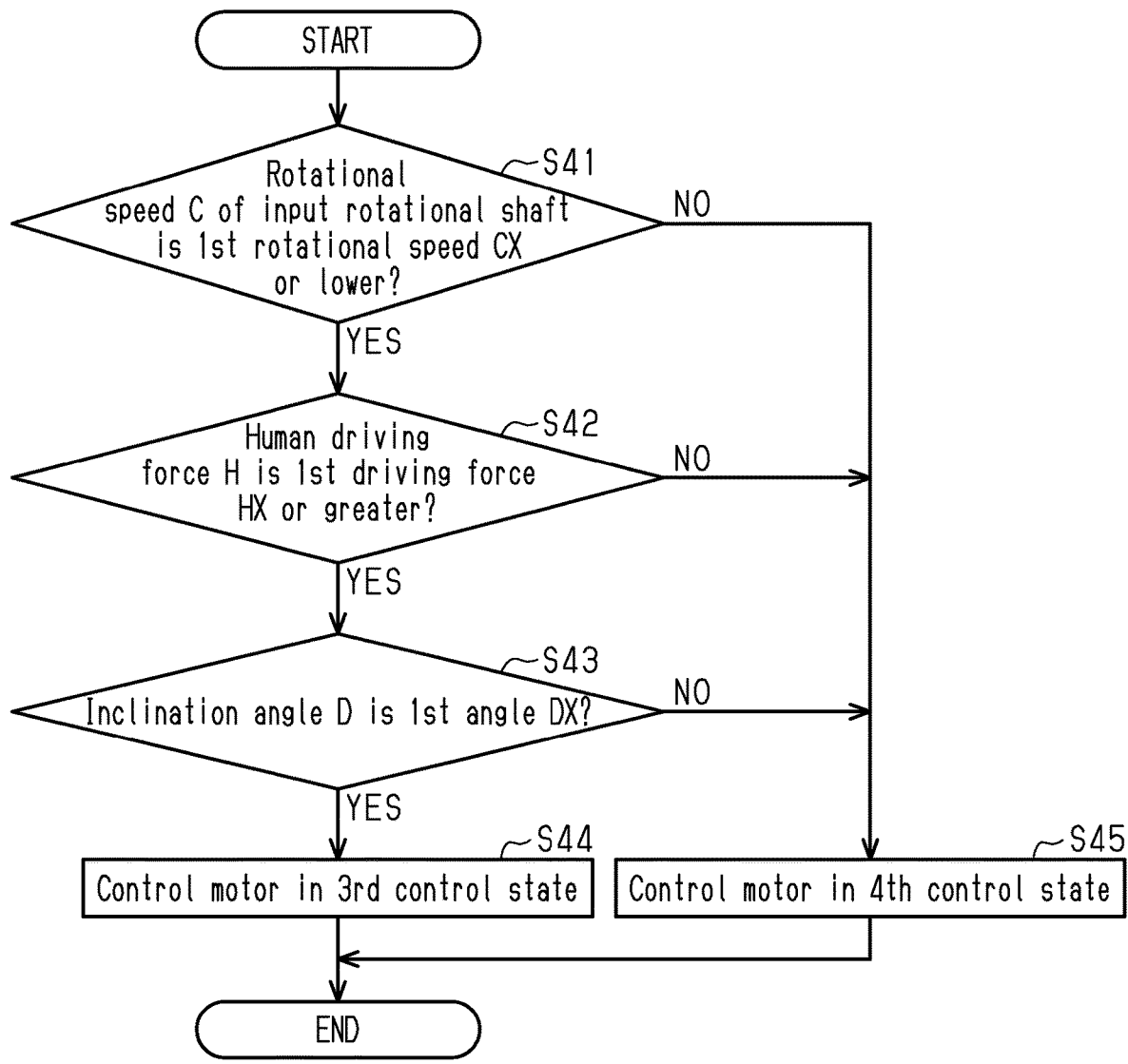
FIG. 7 is a flowchart illustrating a process executed by an electronic controller in accordance with a third embodiment to control the motor.

The human-powered vehicle control device 60 in accordance with a third embodiment will now be described with reference to FIG. 7. The human-powered vehicle control device 60 in the third embodiment is configured in the same manner as the human-powered vehicle control device 60 in the first embodiment except in that the flowchart shown in FIG. 7 is performed instead of the flowchart shown in FIGS. 3 and 4. Same reference numerals are given to those components in the human-powered vehicle control device 60 of the third embodiment that are the same as the corresponding components of the first embodiment. Such components will not be described in detail.

The electronic controller 62 controls the motor 38 in a third control state in a case where the rotational speed C of the input rotational shaft 12A of the human-powered vehicle 10 is lower than or equal to the first rotational speed CX, the human driving force H input to the human-powered vehicle 10 is greater than or equal to the first driving force HX, and the inclination angle D of the human-powered vehicle 10 is equal to a first angle DX. The electronic controller 62 controls the motor 38 in a fourth control state that differs from the third control state in a case where the rotational speed C of the input rotational shaft 12A is lower than or equal to the first rotational speed CX, the human driving force H is greater than or equal to the first driving force HX, and the inclination angle D of the human-powered vehicle 10 is equal to a second angle DW differing from the first angle DX. Preferably, the first angle DX includes an angle that is greater than or equal to a predetermined angle DA. Preferably, the second angle DW includes an angle that is less than the predetermined angle DA.

In the fourth control state, the electronic controller 62 controls the motor 38 in accordance with, for example, one of twenty-first to twenty-fourth examples. In the fourth control state, the electronic controller 62 can control the motor 38 in a manner combining one of the twenty-first and twenty-second examples and one of the twenty-third and twenty-fourth examples.

In the twenty-first example, the inclination angle D is a pitch angle of the human-powered vehicle 10 in a case where the human-powered vehicle 10 is traveling uphill, and the first angle DX is greater than the second angle DW. The electronic controller 62 controls the motor 38 to increase the maximum value MX of the output M of the motor 38 in the third control state from the maximum value MX of the output M of the motor 38 in the fourth control state. In the twenty-second example, the inclination angle D is a pitch angle of the human-powered vehicle 10 in a case where the human-powered vehicle 10 is traveling uphill, and the first angle DX is greater than the second angle DW. The electronic controller 62 controls the motor 38 to decrease the maximum value MX of the output M of the motor 38 in the third control state from the maximum value MX of the output M of the motor 38 in the fourth control state. Preferably, in the twenty-first and twenty-second examples, the predetermined angle DA is a pitch angle that corresponds to an uphill, which has a road gradient greater than or equal to a predetermined value. In the twenty-first and twenty-second examples, the predetermined angle DA is, for example, an angle in a range of five degrees or greater and twenty degrees or less.

In the twenty-third example, the inclination angle D is a pitch angle of the human-powered vehicle 10 in a case where the human-powered vehicle 10 is traveling downhill, and the first angle DX is greater than the second angle DW. The electronic controller 62 controls the motor 38 to decrease the maximum value MX of the output M of the motor 38 in the third control state from the maximum value MX of the output M of the motor 38 in the fourth control state. In the twenty-fourth example, the inclination angle D is a pitch angle of the human-powered vehicle 10 in a case where the human-powered vehicle 10 is traveling downhill, and the first angle DX is greater than the second angle DW. The electronic controller 62 controls the motor 38 to increase the maximum value MX of the output M of the motor 38 in the third control state from the maximum value MX of the output M of the motor 38 in the fourth control state. Preferably, in the twenty-third and twenty-fourth examples, the predetermined angle DA is a pitch angle that corresponds to a downhill, which has a road gradient greater than or equal to a predetermined value. In the twenty-third and twenty-fourth examples, the predetermined angle DA is, for example, an angle in a range of five degrees or greater and twenty degrees or less.

Preferably, in the twenty-first to twenty-fourth examples, the electronic controller 62 controls the motor 38 in the fourth control state in a case where the rotational speed C of the input rotational shaft 12A is higher than the first rotational speed CX and the inclination angle D is equal to the first angle DX or a case where the human driving force H input to the human-powered vehicle 10 is less than the first driving force HX and the inclination angle D is equal to the first angle DX.

A process executed by the electronic controller 62 to control the motor 38 will now be described with reference to FIG. 7. In a case where electric power is supplied to the electronic controller 62, the electronic controller 62 starts the process from step S41 of the flowchart shown in FIG. 7. In a case where the process of the flowchart shown in FIG. 7 ends, the electronic controller 62 repeats the process from step S41 in predetermined cycles until the supply of electric power stops.

In step S41, the electronic controller 62 determines whether the rotational speed C of the input rotational shaft 12A is lower than or equal to the first rotational speed CX. In a case where the rotational speed C of the input rotational shaft 12A is not lower than or equal to the first rotational speed CX, the electronic controller 62 proceeds to step S45. In step S45, the electronic controller 62 controls the motor 38 in the fourth control state and then ends the process. In step S41, in a case where the rotational speed C of the input rotational shaft 12A is lower than or equal to the first rotational speed CX, the electronic controller 62 proceeds to step S42.

In step S42, the electronic controller 62 determines whether the human driving force H is greater than or equal to the first driving force HX. In a case where the human driving force H is not greater than or equal to the first driving force HX, the electronic controller 62 proceeds to step S45. In step S45, the electronic controller 62 controls the motor 38 in the fourth control state and then ends the process. In step S42, in a case where the human driving force H is greater than or equal to the first driving force HX, the electronic controller 62 proceeds to step S43.

In step S43, the electronic controller 62 determines whether the inclination angle D is equal to the first angle DX. In a case where the inclination angle D is not equal to the first angle DX, the electronic controller 62 proceeds to step S45. In step S45, the electronic controller 62 controls the motor 38 in the fourth control state and then ends the process. In step S43, in a case where the inclination angle D is equal to the first angle DX, the electronic controller 62 proceeds to step S44. In step S44, the electronic controller 62 controls the motor 38 in the third control state and then ends the process. In the flowchart shown in FIG. 7, steps S41, S42, and S43 can be performed in any order.

Fourth Embodiment

Figure 8:
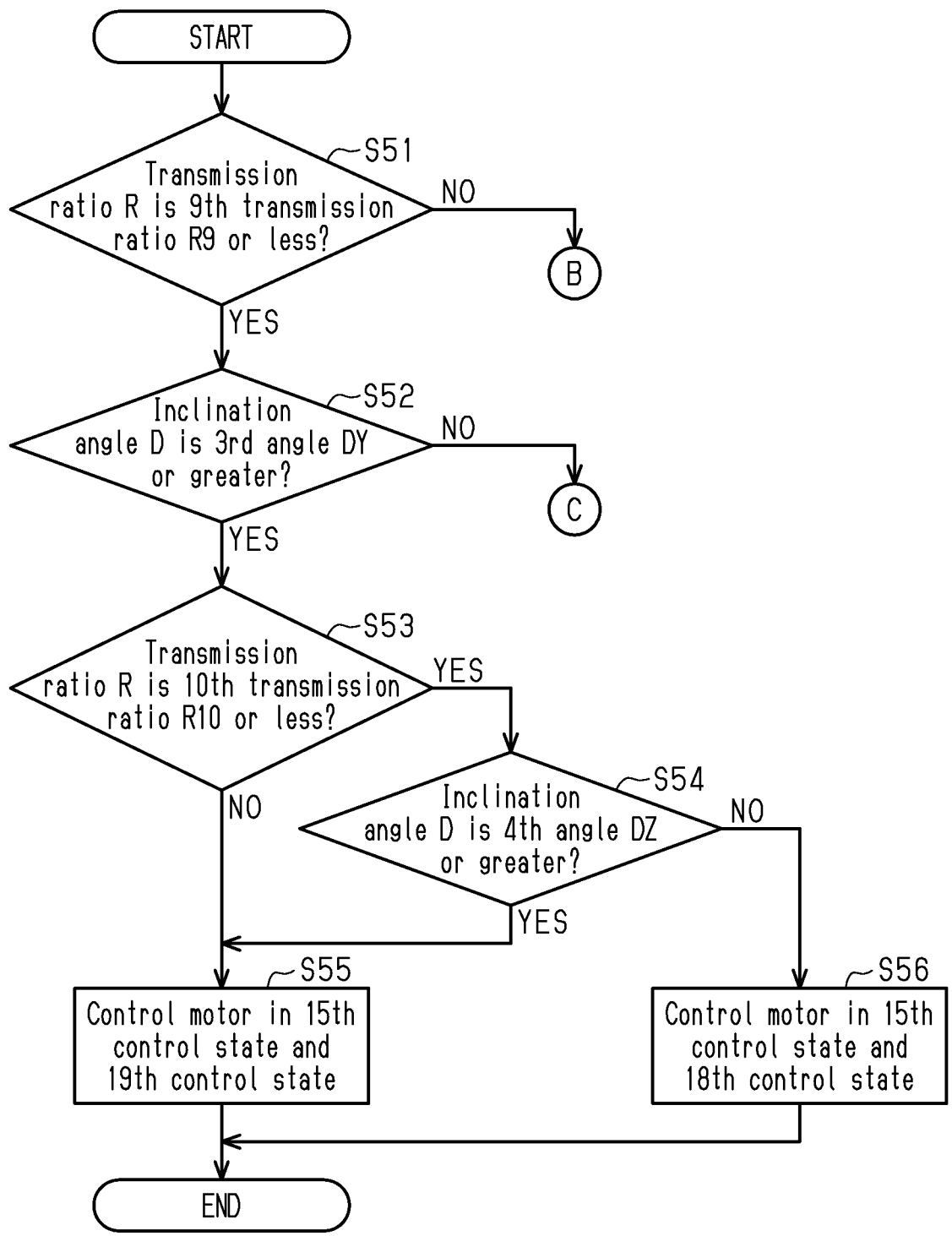
FIG. 8 is a flowchart illustrating a first part of a process executed by an electronic controller in accordance with a fourth embodiment to control a motor.
Figure 9:
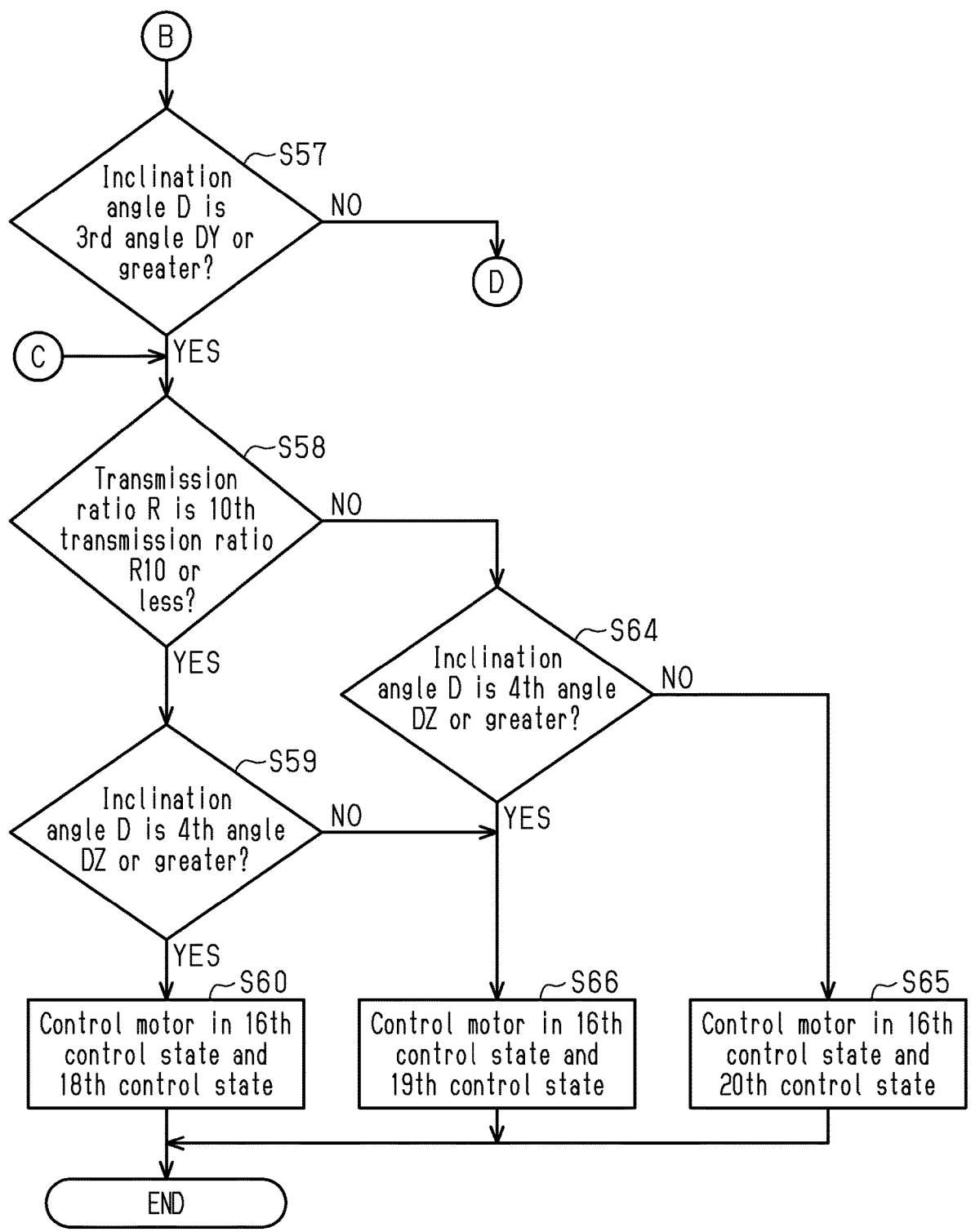
FIG. 9 is a flowchart illustrating a second part of the process executed by the electronic controller in accordance with the fourth embodiment to control the motor.
Figure 10:
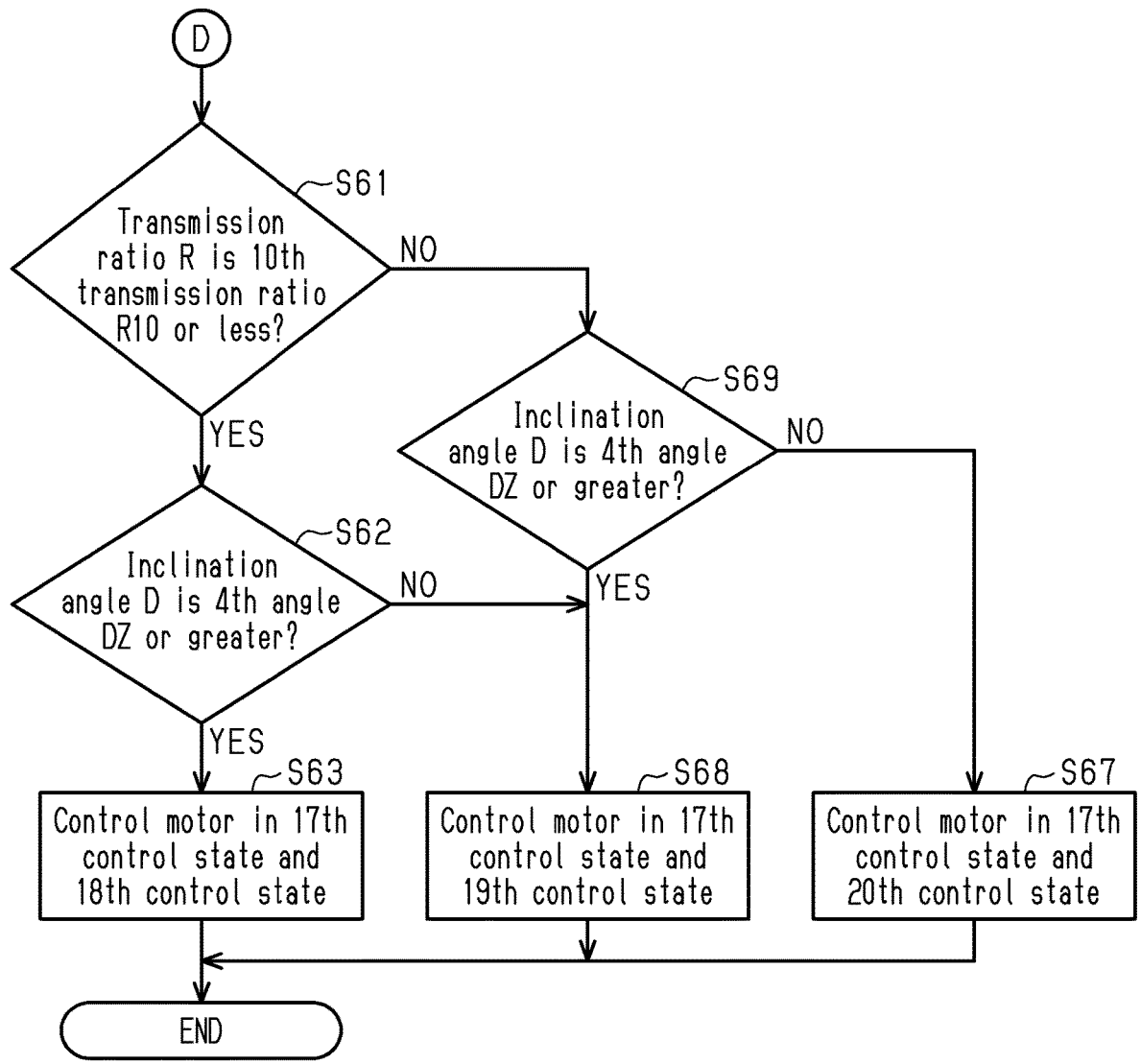
FIG. 10 is a flowchart illustrating a third part of the process executed by the electronic controller in accordance with the fourth embodiment to control the motor.

The human-powered vehicle control device 60 in accordance with a fourth embodiment will now be described with reference to FIGS. 8 to 10. The human-powered vehicle control device 60 in the fourth embodiment is configured in the same manner as the human-powered vehicle control device 60 in the first embodiment except in that the flowchart shown in FIGS. 8 to 10 is performed instead of the flowchart shown in FIGS. 3 and 4. Same reference numerals are given to those components in the human-powered vehicle control device 60 of the fourth embodiment that are the same as the corresponding components of the first embodiment. Such components will not be described in detail.

The electronic controller 62 controls the motor 38 in accordance with the information related to the transmission ratio R in the power transmission path between the input rotational shaft 12A of the human-powered vehicle 10 and the wheel 14 of the human-powered vehicle 10 and the information related to the inclination angle D of the human-powered vehicle 10. Preferably, the inclination angle D of the human-powered vehicle 10 is a pitch angle of the human-powered vehicle 10 in a case where the human-powered vehicle 10 is traveling uphill.

The electronic controller 62 controls the motor 38 to increase at least one of the assist ratio A of the assist force produced by the motor 38 to the human driving force H input to the human-powered vehicle 10, the maximum value MX of the output M of the motor 38, and the first changing ratio P1 of the increase rate of the output M of the motor 38 to the increase rate of the human driving force H in a case where the transmission ratio R is less than or equal to a ninth ratio R9 and the inclination angle D is greater than or equal to a third angle DY from a case where the transmission ratio R is less than or equal to the ninth ratio R9 and the inclination angle D is less than the third angle DY or a case where the transmission ratio R is greater than the ninth ratio R9 and the inclination angle D is greater than or equal to the third angle DY. Preferably, the electronic controller 62 controls the motor 38 to decrease the second changing ratio P2 of the decrease rate of the output M of the motor 38 to the decrease rate of the human driving force H input to the human-powered vehicle 10 in a case where the transmission ratio R is less than or equal to a tenth ratio R10 and the inclination angle D is greater than or equal to a fourth angle DZ from a case where the transmission ratio R is less than or equal to the tenth ratio R10 and the inclination angle D is less than the fourth angle DZ or a case where the transmission ratio R is greater than the tenth ratio R10 and the inclination angle D is greater than or equal to the fourth angle DZ. The ninth and tenth ratios R9 and R10 can be equal to any one of the first to sixth ratios R1 to R6 in the first embodiment or differ from every one of the first to sixth ratios R1 to R6. Preferably, the ninth and tenth ratios R9 and R10 are equal to one of the first, third, and fifth ratios R1, R3, and R5 in the first embodiment.

Preferably, the electronic controller 62 controls the motor 38 in a fifteenth control state in a case where the transmission ratio R is less than or equal to the ninth ratio R9 and the inclination angle D is greater than or equal to the third angle DY. Preferably, the electronic controller 62 controls the motor 38 in a sixteenth control state in a case where the transmission ratio R is less than or equal to the ninth ratio R9 and the inclination angle D is less than the third angle DY or a case where the transmission ratio R is greater than the ninth ratio R9 and the inclination angle D is greater than or equal to the third angle DY. Preferably, the electronic controller 62 controls the motor 38 in a seventeenth control state in a case where the transmission ratio R is greater than the ninth ratio R9 and the inclination angle D is less than the third angle DY.

In the fifteenth and seventeenth control states, the electronic controller 62 can control the motor 38 in substantially the same manner or different manners. For example, the electronic controller 62 can control the motor 38 to decrease at least one of the assist ratio A, the maximum value MX of the output M of the motor 38, and the first changing ratio P1 in the seventeenth control state from the fifteenth control state. For example, the electronic controller 62 can control the motor 38 to increase at least one of the assist ratio A, the maximum value MX of the output M of the motor 38, and the first changing ratio P1 in the seventeenth control state from the fifteenth control state.

Preferably, the electronic controller 62 controls the motor 38 in an eighteenth control state in a case where the transmission ratio R is less than or equal to the tenth ratio R10 and the inclination angle D is greater than or equal to the fourth angle DZ. Preferably, the electronic controller 62 controls the motor 38 in a nineteenth control state in a case where the transmission ratio R is less than or equal to the tenth ratio R10 and the inclination angle D is less than the fourth angle DZ or a case where the transmission ratio R is greater than the tenth ratio R10 and the inclination angle D is greater than or equal to the fourth angle DZ. Preferably, the electronic controller 62 controls the motor 38 in a twentieth control state in a case where the transmission ratio R is greater than the tenth ratio R10 and the inclination angle D is less than the fourth angle DZ.

In the eighteenth and twentieth control states, the electronic controller 62 can control the motor 38 in substantially the same manner or different manners. For example, the electronic controller 62 can control the motor 38 to decrease the second changing ratio P2 of the decrease rate of the output M of the motor 38 to the decrease rate of the human driving force H input to the human-powered vehicle 10 in the twentieth control state from the eighteenth control state. For example, the electronic controller 62 can control the motor 38 to increase the second changing ratio P2 of the decrease rate of the output M of the motor 38 to the decrease rate of the human driving force H input to the human-powered vehicle 10 in the twentieth control state from the eighteenth control state.

A process executed by the electronic controller 62 to control the motor 38 will now be described with reference to FIGS. 8 to 10. In a case where electric power is supplied to the electronic controller 62, the electronic controller 62 starts the process from step S51 of the flowchart shown in FIG. 8. In a case where the process of the flowchart shown in FIGS. 8 to 10 ends, the electronic controller 62 repeats the process from step S51 in predetermined cycles until the supply of electric power stops.

In step S51, the electronic controller 62 determines whether the transmission ratio R is less than or equal to the ninth ratio R9. In a case where the transmission ratio R is less than or equal to the ninth ratio R9, the electronic controller 62 proceeds to step S52. In step S52, the electronic controller 62 determines whether the inclination angle D is greater than or equal to the third angle DY. In a case where the inclination angle D is greater than or equal to the third angle DY, the electronic controller 62 proceeds to step S53.

In step S53, the electronic controller 62 determines whether the transmission ratio R is less than or equal to the tenth ratio R10. In a case where the transmission ratio R is not less than or equal to the tenth ratio R10 in step S53, the electronic controller 62 proceeds to step S55. In step S55, the electronic controller 62 controls the motor 38 in the fifteenth control state and the nineteenth control state and then ends the process.

In step S53, in a case where the transmission ratio R is less than or equal to the tenth ratio R10, the electronic controller 62 proceeds to step S54. In step S54, in a case where the inclination angle D is not greater than or equal to the fourth angle DZ, the electronic controller 62 proceeds to step S56. In step S54, in a case where the inclination angle D is greater than or equal to the fourth angle DZ, the electronic controller 62 proceeds to step S55. In step S56, the electronic controller 62 controls the motor 38 in the fifteenth control state and the eighteenth control state and then ends the process.

In step S51, in a case where the transmission ratio R is not less than or equal to the ninth ratio R9, the electronic controller 62 proceeds to step S57. In step S57, the electronic controller 62 determines whether the inclination angle D is greater than or equal to the third angle DY. In a case where the inclination angle D is greater than or equal to the third angle DY in step S57, the electronic controller 62 proceeds to step S58. In a case where the inclination angle D is not greater than or equal to the third angle DY in step S52, the electronic controller 62 proceeds to step S59.

In step S58, the electronic controller 62 determines whether the transmission ratio R is less than or equal to the tenth ratio R10. In a case where the transmission ratio R is less than or equal to the tenth ratio R10 in step S58, the electronic controller 62 proceeds to step S59. In step S59, the electronic controller 62 determines whether the inclination angle D is greater than or equal to the fourth angle DZ. In a case where the inclination angle D is greater than or equal to the fourth angle DZ in step S59, the electronic controller 62 proceeds to step S60. In step S60, the electronic controller 62 controls the motor 38 in the sixteenth control state and the eighteenth control state and then ends the process.

In step S58, in a case where the transmission ratio R is not less than or equal to the tenth ratio R10, the electronic controller 62 proceeds to step S64. In step S64, the electronic controller 62 determines whether the inclination angle D is greater than or equal to the fourth angle DZ. In a case where the inclination angle D is greater than or equal to the fourth angle DZ in step S64, the electronic controller 62 proceeds to step S66. In step S59, in a case where the inclination angle D is not greater than or equal to the fourth angle DZ, the electronic controller 62 proceeds to step S66. In step S66, the electronic controller 62 controls the motor 38 in the sixteenth control state and the nineteenth control state and then ends the process. In step S64, in a case where the inclination angle D is not greater than or equal to the fourth angle DZ, the electronic controller 62 proceeds to step S65. In step S65, the electronic controller 62 controls the motor 38 in the sixteenth control state and the twentieth control state and then ends the process.

In step S57, in a case where the inclination angle D is not greater than or equal to the third angle DY, the electronic controller 62 proceeds to step S61. In step S61, the electronic controller 62 determines whether the transmission ratio R is less than or equal to the tenth ratio R10. In a case where the transmission ratio R is less than or equal to the tenth ratio R10 in step S61, the electronic controller 62 proceeds to step S62. In step S62, the electronic controller 62 determines whether the inclination angle D is greater than or equal to the fourth angle DZ. In a case where the inclination angle D is greater than or equal to the fourth angle DZ in step S62, the electronic controller 62 proceeds to step S63. In step S63, the electronic controller 62 controls the motor 38 in the seventeenth control state and the eighteenth control state and then ends the process. In step S62, in a case where the inclination angle D is not greater than or equal to the fourth angle DZ, the electronic controller 62 proceeds to step S68.

In step S61, in a case where the transmission ratio R is not less than or equal to the tenth ratio R10, the electronic controller 62 proceeds to step S69. In step S69, the electronic controller 62 determines whether the inclination angle D is greater than or equal to the fourth angle DZ. In a case where the inclination angle D is greater than or equal to the fourth angle DZ in step S69, the electronic controller 62 proceeds to step S68. In step S68, the electronic controller 62 controls the motor 38 in the seventeenth control state and the nineteenth control state and then ends the process. In step S69, in a case where the inclination angle D is not greater than or equal to the fourth angle DZ, the electronic controller 62 proceeds to step S67. In step S67, the electronic controller 62 controls the motor 38 in the seventeenth control state and the twentieth control state and then ends the process.

In the flowchart shown in FIGS. 8 to 10, steps S57, S58, S59, S64, S66, S65, S61, S62, S63, S69, S67, and S68 can be omitted. In this case, where a negative determination is given in step S51, the electronic controller 62 proceeds to step S60. In this case, where a negative determination is given in step S52, the electronic controller 62 proceeds to step S60.

In the flowchart shown in FIGS. 8 to 10, steps S51 to S56 can be omitted. In this case, where electric power is supplied to the electronic controller 62, the electronic controller 62 starts the process from step S57 of the flowchart shown in FIG. 9. In a case where the process of the flowchart shown in FIGS. 9 and 10 ends, the electronic controller 62 repeats the process from step S57 in predetermined cycles until the supply of electric power stops.

Figure 11:
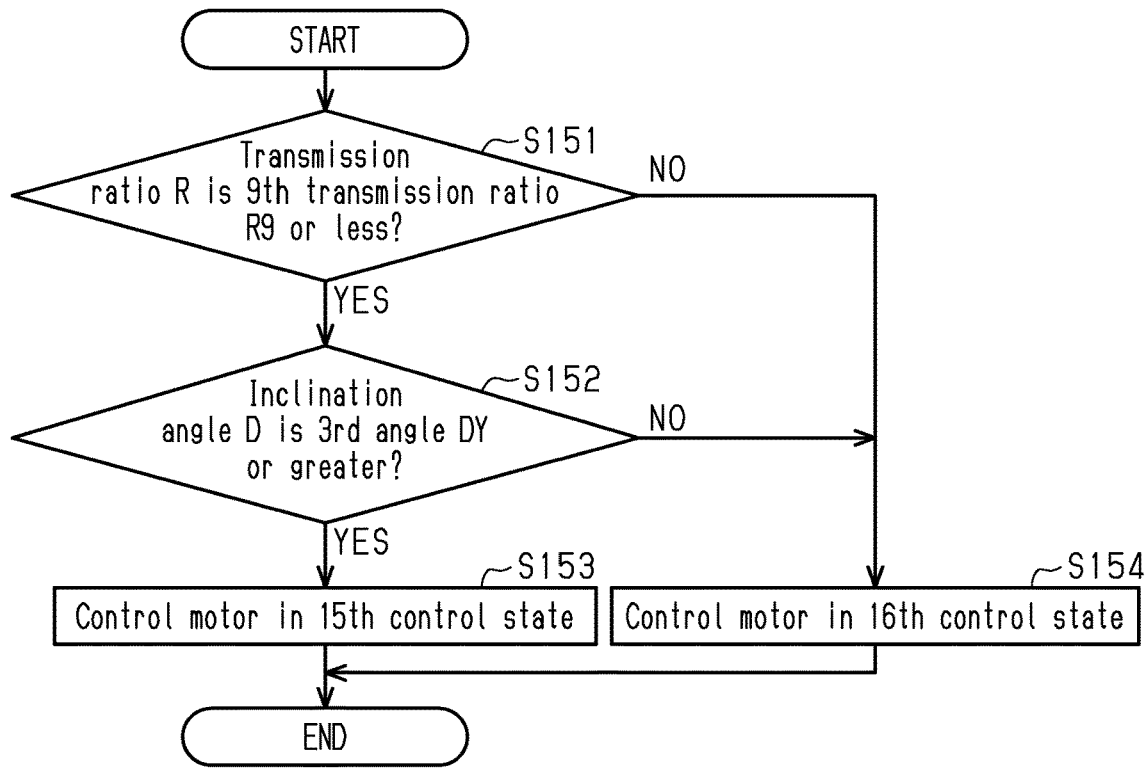
FIG. 11 is a flowchart illustrating a process executed by an electronic controller in accordance with a first modification of the fourth embodiment to control the motor.

The flowchart shown in FIGS. 8 to 10 can be changed to the flowchart shown in FIG. 11. In a case where electric power is supplied to the electronic controller 62, the electronic controller 62 starts the process from step S151 of the flowchart in FIG. 11. In a case where the process of the flowchart shown in FIG. 11 ends, the electronic controller 62 repeats the process from step S151 in predetermined cycles until the supply of electric power stops.

In step S151, the electronic controller 62 determines whether the transmission ratio R is less than or equal to the ninth ratio R9. In a case where the transmission ratio R is less than or equal to the ninth ratio R9, the electronic controller 62 proceeds to step S152. In step S152, the electronic controller 62 determines whether the inclination angle D is greater than or equal to the third angle DY. In a case where the inclination angle D is greater than or equal to the third angle DY, the electronic controller 62 controls the motor 38 in the fifteenth control state in step S153 and then ends the process.

In step S151, in a case where the transmission ratio R is not less than or equal to the ninth ratio R9, the electronic controller 62 proceeds to step S154. In step S152, in a case where the inclination angle D is not greater than or equal to the third angle DY, the electronic controller 62 proceeds to step S154. In step S154, the electronic controller 62 controls the motor 38 in the sixteenth control state and then ends the process.

Figure 12:
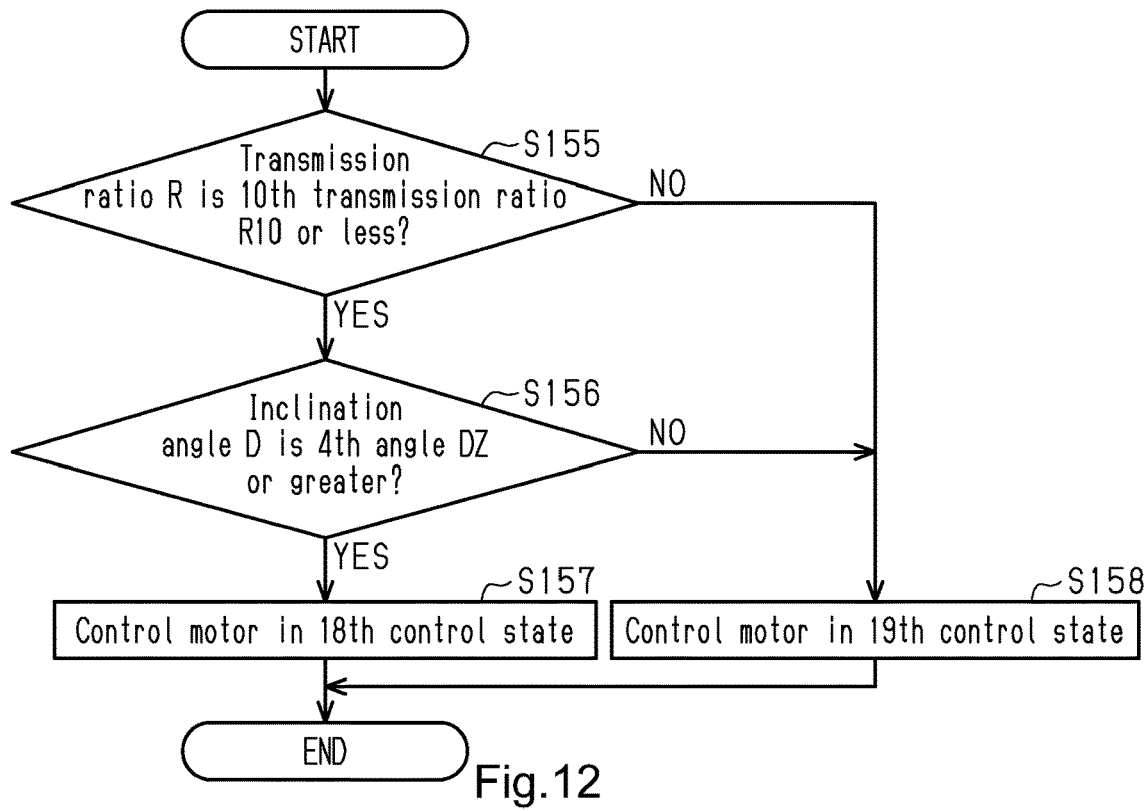
FIG. 12 is a flowchart illustrating a process executed by an electronic controller in accordance with a second modification of the fourth embodiment to control the motor.

The flowchart shown in FIGS. 8 to 10 can be changed to the flowchart shown in FIG. 12. In a case where electric power is supplied to the electronic controller 62, the electronic controller 62 starts the process from step S155 of the flowchart in FIG. 12. In a case where the process of the flowchart shown in FIG. 12 ends, the electronic controller 62 repeats the process from step S155 in predetermined cycles until the supply of electric power stops.

In step S155, the electronic controller 62 determines whether the transmission ratio R is less than or equal to the tenth ratio R10. In a case where the transmission ratio R is less than or equal to the tenth ratio R10, the electronic controller 62 proceeds to step S156. In step S156, the electronic controller 62 determines whether the inclination angle D is greater than or equal to the fourth angle DZ. In a case where the inclination angle D is greater than or equal to the fourth angle DZ, the electronic controller 62 proceeds to step S157 and controls the motor 38 in the eighteenth control state. Then, the electronic controller 62 ends the process.

In step S155, in a case where the transmission ratio R is not less than or equal to the tenth ratio R10, the electronic controller 62 proceeds to step S158. In step S156, in a case where the inclination angle D is not greater than or equal to the fourth angle DZ, the electronic controller 62 proceeds to step S158. In step S158, the electronic controller 62 controls the motor 38 in the nineteenth control state and then ends the process.

Fifth Embodiment

Figure 13:
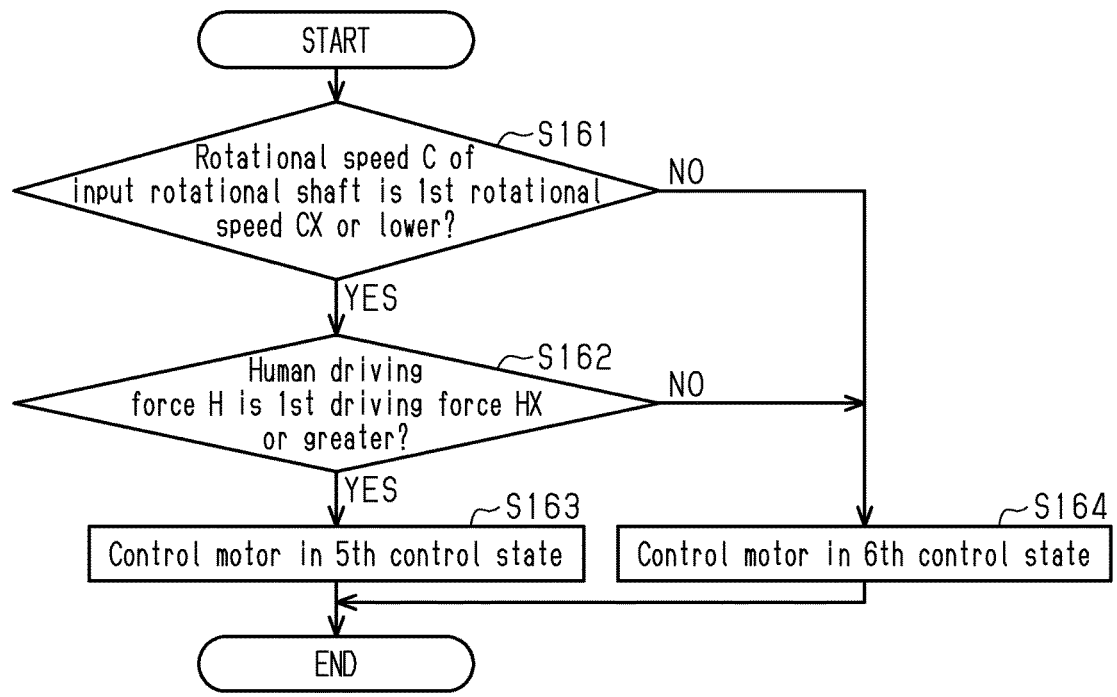
FIG. 13 is a flowchart illustrating a process executed by an electronic controller in accordance with a fifth embodiment to control a motor.

The human-powered vehicle control device 60 in accordance with a fifth embodiment will now be described with reference to FIG. 13. The human-powered vehicle control device 60 in the fifth embodiment is configured in the same manner as the human-powered vehicle control device 60 in the first embodiment except in that the flowchart in FIG. 13 is performed instead of the flowchart in FIGS. 3 and 4. Same reference numerals are given to those components in the human-powered vehicle control device 60 of the fifth embodiment that are the same as the corresponding components of the first embodiment. Such components will not be described in detail.

The electronic controller 62 controls the motor 38 in a fifth control state in a case where the rotational speed C of the input rotational shaft 12A of the human-powered vehicle 10 is lower than or equal to the first rotational speed CX and the human driving force H input to the human-powered vehicle 10 is greater than or equal to the first driving force HX. Further, the electronic controller 62 controls the motor 38 in a sixth control state in a case where the rotational speed C of the input rotational shaft 12A is higher than the first rotational speed CX or the human driving force H is less than the first driving force HX. At least one of the maximum value MX of the output M of the motor 38, the first changing ratio P1 of the increase rate of the output M of the motor 38 to the increase rate of the human driving force H, and the second changing ratio P2 of the decrease rate of the output M of the motor 38 to the decrease rate of the human driving force H differs between the fifth control state and the sixth control state.

A process executed by the electronic controller 62 to control the motor 38 will now be described with reference to FIG. 13. In a case where electric power is supplied to the electronic controller 62, the electronic controller 62 starts the process from step S161 of the flowchart shown in FIG. 13. In a case where the process of the flowchart shown in FIG. 13 ends, the electronic controller 62 repeats the process from step S161 in predetermined cycles until the supply of electric power stops.

In step S161, the electronic controller 62 determines whether the rotational speed C of the input rotational shaft 12A is lower than or equal to the first rotational speed CX. In a case where the rotational speed C of the input rotational shaft 12A is not lower than or equal to the first rotational speed CX, the electronic controller 62 proceeds to step S164. In step S164, the electronic controller 62 controls the motor 38 in the sixth control state and then ends the process. In step S161, in a case where the rotational speed C of the input rotational shaft 12A is lower than or equal to the first rotational speed CX, the electronic controller 62 proceeds to step S162.

In step S162, the electronic controller 62 determines whether the human driving force H is greater than or equal to the first driving force HX. In a case where the human driving force H is not greater than or equal to the first driving force HX, the electronic controller 62 proceeds to step S164. In step S164, the electronic controller 62 controls the motor 38 in the sixth control state and then ends the process. In step S162, in a case where the human driving force H is greater than or equal to the first driving force HX, the electronic controller 62 proceeds to step S163. In step S163, the electronic controller 62 controls the motor 38 in the fifth control state and then ends the process. In the flowchart shown in FIG. 13, step S161 and step S162 can be performed in any order.

Sixth Embodiment

Figure 14:
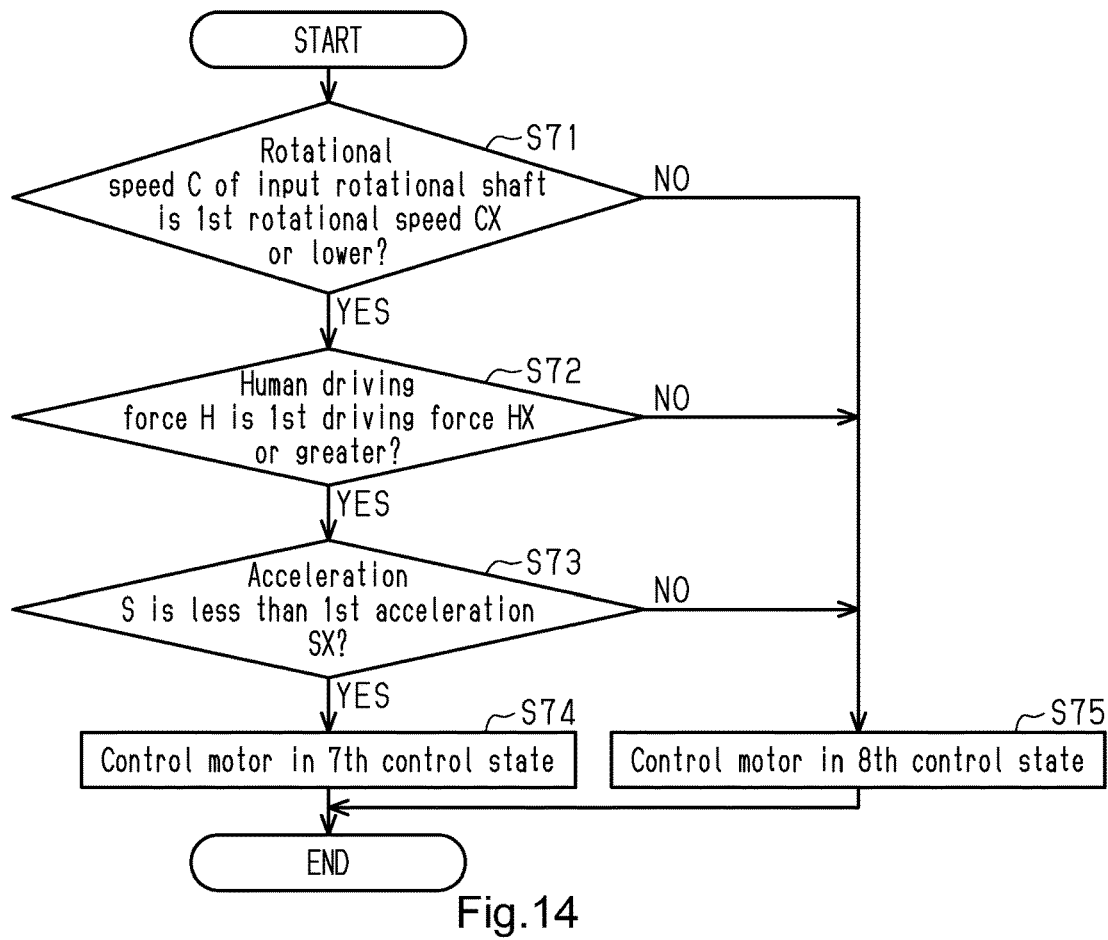
FIG. 14 is a flowchart illustrating a process executed by an electronic controller in accordance with a sixth embodiment to control a motor.

The human-powered vehicle control device 60 in accordance with a sixth embodiment will now be described with reference to FIG. 14. The human-powered vehicle control device 60 in the sixth embodiment is configured in the same manner as the human-powered vehicle control device 60 in the first embodiment except in that the flowchart in FIG. 14 is performed instead of the flowchart in FIGS. 3 and 4. Same reference numerals are given to those components in the human-powered vehicle control device 60 of the sixth embodiment that are the same as the corresponding components of the first embodiment. Such components will not be described in detail.

The electronic controller 62 controls the motor 38 in a seventh control state in a case where the rotational speed C of the input rotational shaft 12A of the human-powered vehicle 10 is lower than or equal to the first rotational speed CX, the human driving force H input to the human-powered vehicle 10 is greater than or equal to the first driving force HX, and the acceleration S in a moving direction of the human-powered vehicle 10 is less than a first acceleration SX. The electronic controller 62 controls the motor 38 in an eighth control state that differs that from seventh control state in at least one of a case where the rotational speed C of the input rotational shaft 12A is higher than the first rotational speed CX, the human driving force H is less than the first driving force HX, and the acceleration S is greater than or equal to the first acceleration SX.

Preferably, the electronic controller 62 controls the motor 38 so that at least one of the assist ratio A of the assist force produced by the motor 38 to the human driving force H, the maximum value MX of the output M of the motor 38, the first changing ratio P1 of the increase rate of the output M of the motor 38 to the increase rate of the human driving force H, and the second changing ratio P2 of the decrease rate of the output M of the motor 38 to the decrease rate of the human driving force H differs between the seventh control state and the eighth control state. Preferably, the electronic controller 62 controls the motor 38 to increase at least one of the assist ratio A of the assist force produced by the motor 38 to the human driving force H, the maximum value MX of the output M of the motor 38, and the first changing ratio P1 of the increase rate of the output M of the motor 38 to the increase rate of the human driving force H in the seventh control state from the eighth control state. Preferably, the electronic controller 62 controls the motor 38 to decrease the second changing ratio P2 of the decrease rate of the output M of the motor 38 to the decrease rate of the human driving force H in the seventh control state from the eighth control state.

A process executed by the electronic controller 62 to control the motor 38 will now be described with reference to FIG. 14. In a case where electric power is supplied to the electronic controller 62, the electronic controller 62 starts the process from step S71 of the flowchart shown in FIG. 14. In a case where the process of the flowchart shown in FIG. 14 ends, the electronic controller 62 repeats the process from step S71 in predetermined cycles until the supply of electric power stops.

In step S71, the electronic controller 62 determines whether the rotational speed C of the input rotational shaft 12A is lower than or equal to the first rotational speed CX. In a case where the rotational speed C of the input rotational shaft 12A is not lower than or equal to the first rotational speed CX, the electronic controller 62 proceeds to step S75. In step S75, the electronic controller 62 controls the motor 38 in the eighth control state and then ends the process. In step S71, in a case where the rotational speed C of the input rotational shaft 12A is lower than or equal to the first rotational speed CX, the electronic controller 62 proceeds to step S72.

In step S72, the electronic controller 62 determines whether the human driving force H is greater than or equal to the first driving force HX. In a case where the human driving force H is not greater than or equal to the first driving force HX, the electronic controller 62 proceeds to step S75. In step S75, the electronic controller 62 controls the motor 38 in the eighth control state and then ends the process. In step S72, in a case where the human driving force H is greater than or equal to the first driving force HX, the electronic controller 62 proceeds to step S73.

In step S73, the electronic controller 62 determines whether the acceleration S is less than the first acceleration SX. In a case where the acceleration S is not less than the first acceleration SX, the electronic controller 62 proceeds to step S75. In step S75, the electronic controller 62 controls the motor 38 in the eighth control state and then ends the process. In step S73, in a case where the acceleration S is less than the first acceleration SX, the electronic controller 62 proceeds to step S74. In step S74, the electronic controller 62 controls the motor 38 in the seventh control state and then ends the process. In the flowchart shown in FIG. 14, steps S71, S72, and S73 can be performed in any order.

Seventh Embodiment

Figure 15:
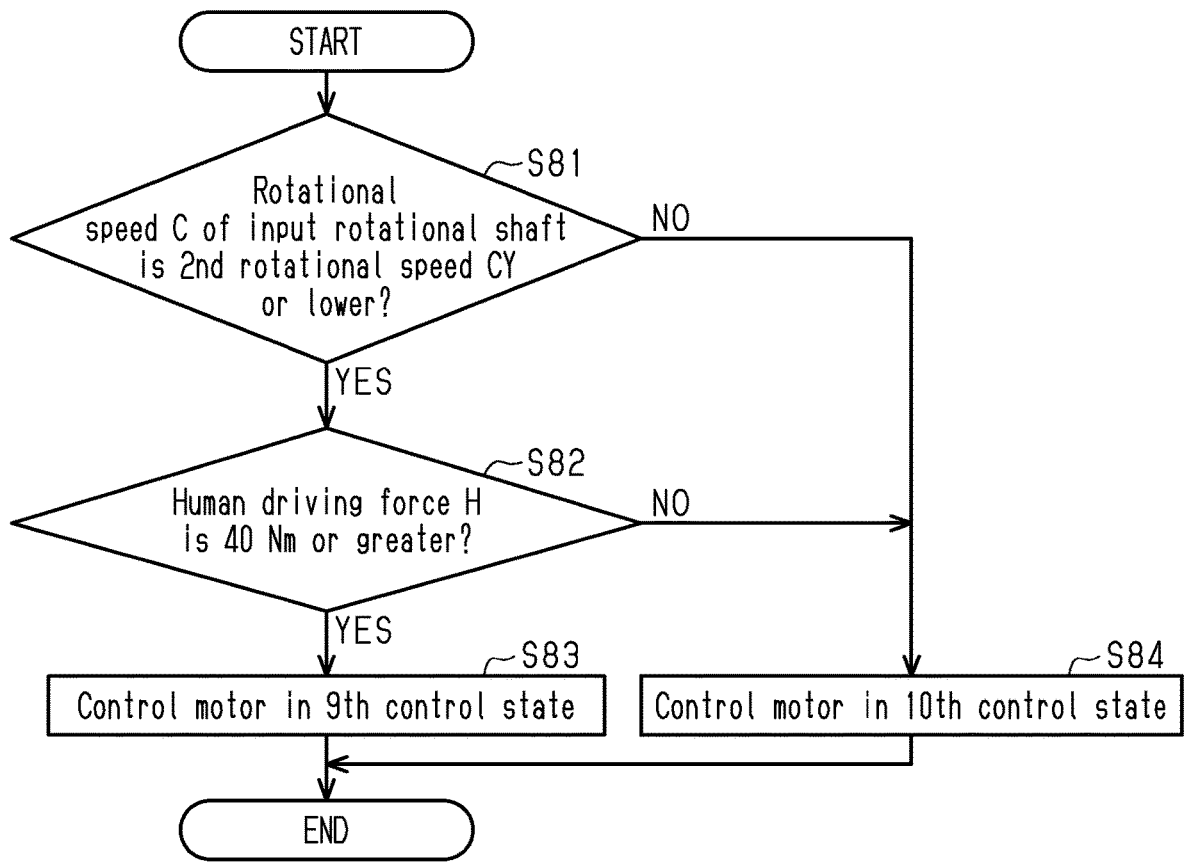
FIG. 15 is a flowchart illustrating a process executed by an electronic controller in accordance with a seventh embodiment to control a motor.

The human-powered vehicle control device 60 in accordance with a seventh embodiment will now be described with reference to FIG. 15. The human-powered vehicle control device 60 in the seventh embodiment is configured in the same manner as the human-powered vehicle control device 60 in the first embodiment except in that the flowchart in FIG. 15 is performed instead of the flowchart in FIGS. 3 and 4. Same reference numerals are given to those components in the human-powered vehicle control device 60 of the seventh embodiment that are the same as the corresponding components of the first embodiment. Such components will not be described in detail.

The electronic controller 62 controls the motor 38 in a ninth control state in a case where the rotational speed C of the input rotational shaft 12A of the human-powered vehicle 10 is lower than or equal to the second rotational speed CY and the human driving force H input to the human-powered vehicle 10 is greater than or equal to 40 Nm. The electronic controller 62 controls the motor 38 in a tenth control state that differs from the ninth control state in a case where the rotational speed C of the input rotational shaft 12A is higher than the second rotational speed CY or the human driving force H is less than 40 Nm. The second rotational speed CY is 5 rpm or greater and 30 rpm or less, for example, 20 rpm. In the present embodiment, the human driving force H input to the human-powered vehicle 10 is torque applied to the input rotational shaft 12A.

Preferably, the electronic controller 62 controls the motor 38 so that at least one of the assist ratio A of the assist force produced by the motor 38 to the human driving force H, the maximum value MX of the output M of the motor 38, the first changing ratio P1 of the increase rate of the output M of the motor 38 to the increase rate of the human driving force H, and the second changing ratio P2 of the decrease rate of the output M of the motor 38 to the decrease rate of the human driving force H differs between the ninth control state and the tenth control state. Preferably, the electronic controller 62 controls the motor 38 to increase at least one of the assist ratio A of the assist force produced by the motor 38 to the human driving force H, the maximum value MX of the output M of the motor 38, and the first changing ratio P1 of the increase rate of the output M of the motor 38 to the increase rate of the human driving force H in the ninth control state from the tenth control state. Preferably, the electronic controller 62 controls the motor 38 to decrease the second changing ratio P2 of the decrease rate of the output M of the motor 38 to the decrease rate of the human driving force H in the ninth control state from the tenth control state.

A process executed by the electronic controller 62 to control the motor 38 in a case where the motor 38 is controlled in the ninth control state or the tenth control state will now be described with reference to the FIG. 15. In a case where electric power is supplied to the electronic controller 62, the electronic controller 62 starts the process from step S81 of the flowchart shown in FIG. 15. In a case where the process of the flowchart shown in FIG. 15 ends, the electronic controller 62 repeats the process from step S81 in predetermined cycles until the supply of electric power stops.

In step S81, the electronic controller 62 determines whether the rotational speed C of the input rotational shaft 12A is lower than or equal to the second rotational speed CY. In a case where the rotational speed C of the input rotational shaft 12A is not lower than or equal to the second rotational speed CY, the electronic controller 62 proceeds to step S84. In step S84, the electronic controller 62 controls the motor 38 in the tenth control state and then ends the process. In step S81, in a case where the rotational speed C of the input rotational shaft 12A is lower than or equal to the second rotational speed CY, the electronic controller 62 proceeds to step S82.

In step S82, the electronic controller 62 determines whether the human driving force H is greater than or equal to 40 Nm. In a case where the human driving force H is not greater than or equal to 40 Nm, the electronic controller 62 proceeds to step S84. In step S84, the electronic controller 62 controls the motor 38 in the tenth control state and then ends the process. In step S82, in a case where the human driving force H is greater than or equal to 40 Nm, the electronic controller 62 proceeds to step S83. In step S83, the electronic controller 62 controls the motor 38 in the ninth control state and then ends the process.

Modifications

The description related with the above embodiments exemplifies, without any intention to limit, applicable forms of a human-powered vehicle control device according to the present disclosure. In addition to the embodiments described above, the human-powered vehicle control device according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

In the second embodiment and modifications of the second embodiment, the eighth ratio R8 can be less than the seventh ratio R7.

In the fourth embodiment and modifications of the fourth embodiment, in a case where, for example, an operation device provided on the handlebar 34 is operated to control the motor 38 instead of controlling the motor 38 in accordance with the human driving force H, the electronic controller 62 can be configured to control the maximum value MX of the output M of the motor 38 in accordance with the information related to the transmission ratio R in the power transmission path between the input rotational shaft 12A of the human-powered vehicle 10 and the wheel 14 of the human-powered vehicle 10 and the information related to the inclination angle D of the human-powered vehicle 10.

In each embodiment and modification, any configuration unnecessary to control the electronic controller 62 can be omitted.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A human-powered vehicle control device for a human-powered vehicle, the human-powered vehicle control device comprising:
   an electronic controller configured to control a motor, which applies a propulsion force to the human-powered vehicle, in accordance with a human driving force input to the human-powered vehicle,
   the electronic controller being configured to control the motor to change at least one of a maximum value of an output of the motor, a first changing ratio of an increase rate of the output of the motor to an increase rate of the human driving force, and a second changing ratio of a decrease rate of the output of the motor to a decrease rate of the human driving force in accordance with transmission information related to a transmission ratio in a power transmission path between an input rotational shaft of the human-powered vehicle and a wheel of the human-powered vehicle.

2. The human-powered vehicle control device according to claim 1, wherein
the electronic controller is configured to control the motor to change at least one of the maximum value of the output of the motor, the first changing ratio of the increase rate of the output of the motor to the increase rate of the human driving force, and the second changing ratio of the decrease rate of the output of the motor to the decrease rate of the human driving force in accordance with the transmission information in at least one of a case where the human-powered vehicle starts traveling, a case where a rotational speed of the input rotational shaft is lower than or equal to a first rotational speed, a case where a vehicle speed of the human-powered vehicle is lower than or equal to a first speed, and a case where the rotational speed of the input rotational shaft is lower than or equal to the first rotational speed and the human driving force is greater than or equal to a first driving force.

3. The human-powered vehicle control device according to claim 1, wherein
the electronic controller is configured to control the motor to change the maximum value of the output of the motor in accordance with the transmission information, and
the electronic controller is configured to control the motor to decrease the maximum value of the output of the motor in a case where the transmission ratio is less than a first ratio from the maximum value of the output of the motor in a case where the transmission ratio is greater than or equal to the first ratio.

4. The human-powered vehicle control device according to claim 1, wherein
the electronic controller is configured to control the motor to change the maximum value of the output of the motor in accordance with the transmission information, and
the electronic controller is configured to control the motor to increase the maximum value of the output of the motor in a case where the transmission ratio is greater than a second ratio from the maximum value of the output of the motor in a case where the transmission ratio is less than or equal to the second ratio.

5. The human-powered vehicle control device according to claim 1, wherein
the electronic controller is configured to control the motor to change the first changing ratio of the increase rate of the output of the motor to the increase rate of the human driving force in accordance with the transmission information, and
the electronic controller is configured to control the motor to decrease the first changing ratio of the increase rate of the output of the motor to the increase rate of the human driving force in a case where the transmission ratio is less than a third ratio from the first changing ratio of the increase rate of the output of the motor to the increase rate of the human driving force in a case where the transmission ratio is greater than or equal to the third ratio.

6. The human-powered vehicle control device according to claim 1, wherein
the electronic controller is configured to control the motor to change the first changing ratio of the increase rate of the output of the motor to the increase rate of the human driving force in accordance with the transmission information, and
the electronic controller is configured to control the motor to increase the first changing ratio of the increase rate of the output of the motor to the increase rate of the human driving force in a case where the transmission ratio is greater than a fourth ratio from the first changing ratio of the increase rate of the output of the motor to the increase rate of the human driving force in a case where the transmission ratio is less than or equal to the fourth ratio.

7. The human-powered vehicle control device according to claim 1, wherein
the electronic controller is configured to control the motor to change the second changing ratio of the decrease rate of the output of the motor to the decrease rate of the human driving force in accordance with the transmission information, and
the electronic controller is configured to control the motor to increase the second changing ratio of the decrease rate of the output of the motor to the decrease rate of the human driving force in a case where the transmission ratio is less than a fifth ratio from the second changing ratio of the decrease rate of the output of the motor to the decrease rate of the human driving force in a case where the transmission ratio is greater than or equal to the fifth ratio.

8. The human-powered vehicle control device according to claim 1, wherein
the electronic controller is configured to control the motor to change the second changing ratio of the decrease rate of the output of the motor to the decrease rate of the human driving force in accordance with the transmission information, and
the electronic controller is configured to control the motor to increase the second changing ratio of the decrease rate of the output of the motor to the decrease rate of the human driving force in a case where the transmission ratio is greater than a sixth ratio from the second changing ratio of the decrease rate of the output of the motor to the decrease rate of the human driving force in a case where the transmission ratio is less than or equal to the sixth ratio.

9. The human-powered vehicle control device according to claim 1, wherein
the electronic controller is configured to control the motor so that a control state of the motor during a predetermined period from when the human-powered vehicle starts traveling differs from the control state of the motor after the predetermined period elapses.

10. A human-powered vehicle control device for a human-powered vehicle, the human-powered vehicle control device comprising:
an electronic controller configured to control a motor that applies a propulsion force to the human-powered vehicle,
the electronic controller being configured to control the motor in a first control state in at least one of a case where a rotational speed of an input rotational shaft of the human-powered vehicle is lower than or equal to a first rotational speed, a human driving force input to the human-powered vehicle is greater than or equal to a first driving force, and a transmission ratio in a power transmission path between the input rotational shaft and a wheel of the human-powered vehicle is equal to a seventh ratio and a case where the human-powered vehicle starts traveling and the transmission ratio is equal to the seventh ratio, and the electronic controller being configured to control the motor in a second control state that differs from the first control state in at least one of a case where the rotational speed of the input rotational shaft is lower than or equal to the first rotational speed, the human driving force is greater than or equal to the first driving force, and the transmission ratio is equal to an eighth ratio differing from the seventh ratio and a case where the human-powered vehicle starts traveling and the transmission ratio is equal to the eighth ratio.

11. The human-powered vehicle control device according to claim 10, wherein
the eighth ratio is greater than the seventh ratio, and
the electronic controller is configured to control the motor in accordance with the human driving force input to the human-powered vehicle to increase an assist ratio of an assist force produced by the motor to the human driving force in the second control state from the assist ratio in the first control state.

12. The human-powered vehicle control device according to claim 10, wherein
the eighth ratio is greater than the seventh ratio, and
the electronic controller is configured to control the motor in accordance with the human driving force input to the human-powered vehicle to increase a maximum value of an output of the motor in the second control state from the maximum value of the output of the motor in the first control state.

13. The human-powered vehicle control device according to claim 10, wherein
the eighth ratio is greater than the seventh ratio, and
the electronic controller is configured to control the motor in accordance with the human driving force input to the human-powered vehicle to increase a first changing ratio of an increase rate of an output of the motor to an increase rate of the human driving force in the second control state from the first changing ratio of the increase rate of the output of the motor to the increase rate of the human driving force in the first control state.

14. The human-powered vehicle control device according to claim 10, wherein
the eighth ratio is greater than the seventh ratio, and
the electronic controller is configured to control the motor in accordance with the human driving force input to the human-powered vehicle to decrease a second changing ratio of a decrease rate of an output of the motor to a decrease rate of the human driving force in the second control state from the second changing ratio of the decrease rate of the output of the motor to the decrease rate of the human driving force in the first control state.

15. The human-powered vehicle control device according to claim 10, wherein
the electronic controller is configured to control the motor in the second control state in a case where the rotational speed of the input rotational shaft of the human-powered vehicle is higher than the first rotational speed and the transmission ratio is equal to the seventh ratio or a case where the human driving force input to the human-powered vehicle is less than the first driving force and the transmission ratio is equal to the seventh ratio.

16. A human-powered vehicle control device for a human-powered vehicle, the human-powered vehicle control device comprising:
an electronic controller configured to control a motor that applies a propulsion force to the human-powered vehicle,
the electronic controller being configured to control the motor in a third control state in a case where a rotational speed of an input rotational shaft of the human-powered vehicle is lower than or equal to a first rotational speed, a human driving force input to the human-powered vehicle being greater than or equal to a first driving force, and an inclination angle of the human-powered vehicle being equal to a first angle, and
the electronic controller being configured to control the motor in a fourth control state that differs from the third control state in a case where the rotational speed of the input rotational shaft is lower than or equal to the first rotational speed, the human driving force being greater than or equal to the first driving force, and the inclination angle of the human-powered vehicle being equal to a second angle differing from the first angle.

17. The human-powered vehicle control device according to claim 16, wherein
the inclination angle is a pitch angle of the human-powered vehicle in a case where the human-powered vehicle is traveling uphill, and
the first angle is greater than the second angle, and
the electronic controller is configured to control the motor to increase a maximum value of an output of the motor in the third control state from the maximum value of the output of the motor in the fourth control state.

18. The human-powered vehicle control device according to claim 16, wherein
the inclination angle is a pitch angle of the human-powered vehicle in a case where the human-powered vehicle is traveling downhill,
the first angle is greater than the second angle, and
the electronic controller is configured to control the motor to decrease a maximum value of an output of the motor in the third control state from the maximum value of the output of the motor in the fourth control state.

19. The human-powered vehicle control device according to claim 17, wherein
the electronic controller is configured to control the motor in the fourth control state in a case where the rotational speed of the input rotational shaft is higher than the first rotational speed and the inclination angle is equal to the first angle or a case where the human driving force input to the human-powered vehicle is less than the first driving force and the inclination angle is equal to the first angle.

20. A human-powered vehicle control device for a human-powered vehicle, the human-powered vehicle control device comprising:
an electronic controller configured to control a motor that applies a propulsion force to the human-powered vehicle,
the electronic controller being configured to control the motor in accordance with information related to an inclination angle of the human-powered vehicle and information related to a transmission ratio in a power transmission path between an input rotational shaft of the human-powered vehicle and a wheel of the human-powered vehicle.

21. The human-powered vehicle control device according to claim 20, wherein
the inclination angle of the human-powered vehicle is a pitch angle of the human-powered vehicle in a case where the human-powered vehicle is traveling uphill, and the electronic controller is configured to control the motor to increase at least one of an assist ratio of an assist force produced by the motor to human driving force input to the human-powered vehicle, a maximum value of an output of the motor, and a first changing ratio of an increase rate of the output of the motor to an increase rate of the human driving force in a case where the transmission ratio is less than or equal to a ninth ratio and the inclination angle is greater than or equal to a third angle from a case where the transmission ratio is less than or equal to the ninth ratio and the inclination angle is less than the third angle or a case where the transmission ratio is greater than the ninth ratio and the inclination angle is greater than or equal to the third angle.

22. The human-powered vehicle control device according to claim 20, wherein
the inclination angle of the human-powered vehicle is a pitch angle of the human-powered vehicle in a case where the human-powered vehicle is traveling uphill, and
the electronic controller is configured to control the motor to decrease a second changing ratio of a decrease rate of an output of the motor to a decrease rate of the human driving force input to the human-powered vehicle in a case where the transmission ratio is less than or equal to a tenth ratio and the inclination angle is greater than or equal to a fourth angle from a case where the transmission ratio is less than or equal to the tenth ratio and the inclination angle is less than the fourth angle or a case where the transmission ratio is greater than the tenth ratio and the inclination angle is greater than or equal to the fourth angle.

23. A human-powered vehicle control device for a human-powered vehicle, the human-powered vehicle control device comprising:
an electronic controller configured to control a motor that applies a propulsion force to the human-powered vehicle,
the electronic controller being configured to control the motor in a fifth control state in a case where a rotational speed of an input rotational shaft of the human-powered vehicle is lower than or equal to a first rotational speed and a human driving force input to the human-powered vehicle is greater than or equal to a first driving force,
the electronic controller being configured to control the motor in a sixth control state in a case where the rotational speed of the input rotational shaft is higher than the first rotational speed or the human driving force input is less than the first driving force, and
at least one of a maximum value of an output of the motor, a first changing ratio of an increase rate of the output of the motor to an increase rate of the human driving force, and a second changing ratio of a decrease rate of the output of the motor to a decrease rate of the human driving force differing between the fifth control state and the sixth control state.

24. A human-powered vehicle control device for a human-powered vehicle, the human-powered vehicle control device comprising:
an electronic controller configured to control a motor that applies a propulsion force to the human-powered vehicle,
the electronic controller being configured to control the motor in a seventh control state in a case where a rotational speed of an input rotational shaft of the human-powered vehicle is lower than or equal to a first rotational speed, a human driving force input to the human-powered vehicle is greater than or equal to a first driving force, and acceleration in a moving direction of the human-powered vehicle is less than a first acceleration, and
the electronic controller being configured to control the motor in an eighth control state that differs from the seventh control state in at least one of a case where the rotational speed of the input rotational shaft is higher than the first rotational speed, the human driving force is less than the first driving force, and the acceleration is greater than or equal to a first acceleration.

25. The human-powered vehicle control device according to claim 24, wherein
the electronic controller is configured to control the motor so that at least one of an assist ratio of an assist force produced by the motor to the human driving force, a maximum value of an output of the motor, a first changing ratio of an increase rate of the output of the motor to an increase rate of the human driving force, and a second changing ratio of a decrease rate of the output of the motor to a decrease rate of the human driving force differs between the seventh control state and the eighth control state.

26. The human-powered vehicle control device according to claim 25, wherein
the electronic controller is configured to control the motor to increase at least one of the assist ratio of the assist force produced by the motor to the human driving force, the maximum value of the output of the motor, and the first changing ratio of the increase rate of the output of the motor to the increase rate of the human driving force in the seventh control state from the eighth control state.

27. The human-powered vehicle control device according to claim 25, wherein
the electronic controller is configured to control the motor to decrease the second changing ratio of the decrease rate of the output of the motor to the decrease rate of the human driving force in the seventh control state from the eighth control state.

28. A human-powered vehicle control device for a human-powered vehicle, the human-powered vehicle control device comprising:
an electronic controller configured to control a motor that applies a propulsion force to the human-powered vehicle,
the electronic controller being configured to control the motor in a ninth control state in a case where a rotational speed of an input rotational shaft of the human-powered vehicle is lower than or equal to a second rotational speed and a human driving force input to the human-powered vehicle is greater than or equal to 40 Nm, and
the electronic controller being configured to control the motor in a tenth control state that differs from the ninth control state in a case where the rotational speed of the input rotational shaft is higher than the second rotational speed or the human driving force is less than 40 Nm.

29. The human-powered vehicle control device according to claim 28, wherein
the electronic controller is configured to control the motor so that at least one of an assist ratio of an assist force produced by the motor to the human driving force, a maximum value of an output of the motor, a first changing ratio of an increase rate of the output of the motor to an increase rate of the human driving force, and a second changing ratio of a decrease rate of the output of the motor to a decrease rate of the human driving force differs between the ninth control state and the tenth control state.

30. The human-powered vehicle control device according to claim 29, wherein
the electronic controller is configured to control the motor to increase at least one of the assist ratio of the assist force produced by the motor to the human driving force, the maximum value of the output of the motor, and the first changing ratio of the increase rate of the output of the motor to the increase rate of the human driving force in the ninth control state from the tenth control state.

31. The human-powered vehicle control device according to claim 29, wherein
the electronic controller is configured to control the motor to decrease the second changing ratio of the decrease rate of the output of the motor to the decrease rate of the human driving force in the ninth control state from the tenth control state.

\* \* \* \* \*